(12) United States Patent
Koito et al.

(10) Patent No.: US 11,829,014 B1
(45) Date of Patent: Nov. 28, 2023

(54) DISPLAY DEVICE

(71) Applicant: Japan Display Inc., Tokyo (JP)

(72) Inventors: Takeo Koito, Tokyo (JP); Shuji Hayashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/206,237

(22) Filed: Jun. 6, 2023

(30) Foreign Application Priority Data

Jun. 8, 2022 (JP) .................................. 2022-092947

(51) Int. Cl.
    *G02F 1/13*     (2006.01)
    *G02F 1/1343*     (2006.01)
    *H04N 13/351*     (2018.01)
    *H04N 13/317*     (2018.01)

(52) U.S. Cl.
CPC ...... *G02F 1/1323* (2013.01); *G02F 1/134363* (2013.01); *H04N 13/317* (2018.05); *H04N 13/351* (2018.05)

(58) Field of Classification Search
CPC ..... G02B 30/32; H04N 13/317; H04N 13/351
See application file for complete search history.

(56) References Cited

U.S. PATENT DOCUMENTS

| | | | |
|---|---|---|---|
| 9,213,203 B2* | 12/2015 | Cho | ...................... H04N 13/359 |
| 2007/0046564 A1* | 3/2007 | Kim | ...................... H04N 13/315 |
| | | | 345/6 |
| 2011/0043715 A1* | 2/2011 | Ohyama | ................ G02B 30/27 |
| | | | 359/462 |

FOREIGN PATENT DOCUMENTS

JP         H09281440 A     10/1997

* cited by examiner

*Primary Examiner* — Alexander P Gross
(74) *Attorney, Agent, or Firm* — K&L Gates LLP

(57) ABSTRACT

According to an aspect, a display device includes: a display panel; and a parallax formation panel disposed between the display panel and a viewpoint. The parallax formation panel includes first electrodes and second electrodes, the first electrodes being provided to be able to form light transmitting regions in accordance with positions of a plurality of predetermined viewpoints, the second electrodes being provided to be able to form light shielding regions that shield regions other than the light transmitting regions from light. A width of each first electrode in a first direction in which the plurality of viewpoints are arranged is longer than a length of each first electrode in a second direction orthogonal to the first direction and extending along a display surface of the display panel.

8 Claims, 18 Drawing Sheets

DISPLAY DEVICE

CROSS-REFERENCE TO RELATED APPLICATION

This application claims the benefit of priority from Japanese Patent Application No. 2022-092947 filed on Jun. 8, 2022, the entire contents of which are incorporated herein by reference.

BACKGROUND

1. Technical Field

What is disclosed herein relates to a display device.

2. Description of the Related Art

As described in Japanese Patent Application Laid-open Publication No. 9-281440, it is known that there are methods of achieving multi-view output in which individual images are output to a plurality of viewpoints include a method of disposing a parallax barrier between a display panel configured to display an image and a viewpoint at which the image is visually recognized. The parallax barrier includes light transmitting parts and light shielding parts alternately arranged in a direction in which the viewpoints are arranged.

Methods of switching the multi-view output and normal image output, in other words, output in which the same image is visually recognizable at any viewpoint include a method of forming the parallax barrier by using a liquid crystal panel. In a typical parallax barrier, light transmitting parts and light shielding parts are alternately arranged in a direction in which a plurality of viewpoints are arranged, and the light transmitting parts and the light shielding parts extend in a direction intersecting the arrangement direction and extending along a liquid crystal panel with which the parallax barrier is formed. With such a parallax barrier, it has been difficult to increase a perceived image resolution.

For the foregoing reasons, there is a need for a display device that can more easily improve the perceived image resolution.

SUMMARY

According to an aspect, a display device includes: a display panel; and a parallax formation panel disposed between the display panel and a viewpoint. The parallax formation panel includes first electrodes and second electrodes, the first electrodes being provided to be able to form light transmitting regions in accordance with positions of a plurality of predetermined viewpoints, the second electrodes being provided to be able to form light shielding regions that shield regions other than the light transmitting regions from light. A width of each first electrode in a first direction in which the plurality of viewpoints are arranged is longer than a length of each first electrode in a second direction orthogonal to the first direction and extending along a display surface of the display panel.

DETAILED DESCRIPTION

An embodiment of the present disclosure is described below with reference to the drawings. What is disclosed herein is only an example, and any modifications that can be easily conceived by those skilled in the art while maintaining the main purpose of the disclosure are naturally included in the scope of the present disclosure. The drawings may be schematically represented in terms of the width, thickness, shape, etc. of each part compared to those in the actual form for the purpose of clearer explanation, but they are only examples and do not limit the interpretation of the present disclosure. In the present specification and the drawings, the same reference sign is applied to the same elements as those already described for the previously mentioned drawings, and detailed explanations may be omitted as appropriate.

In this disclosure, when an element is described as being "on" another element, the element can be directly on the other element, or there can be one or more elements between the element and the other element.

Figure 1:
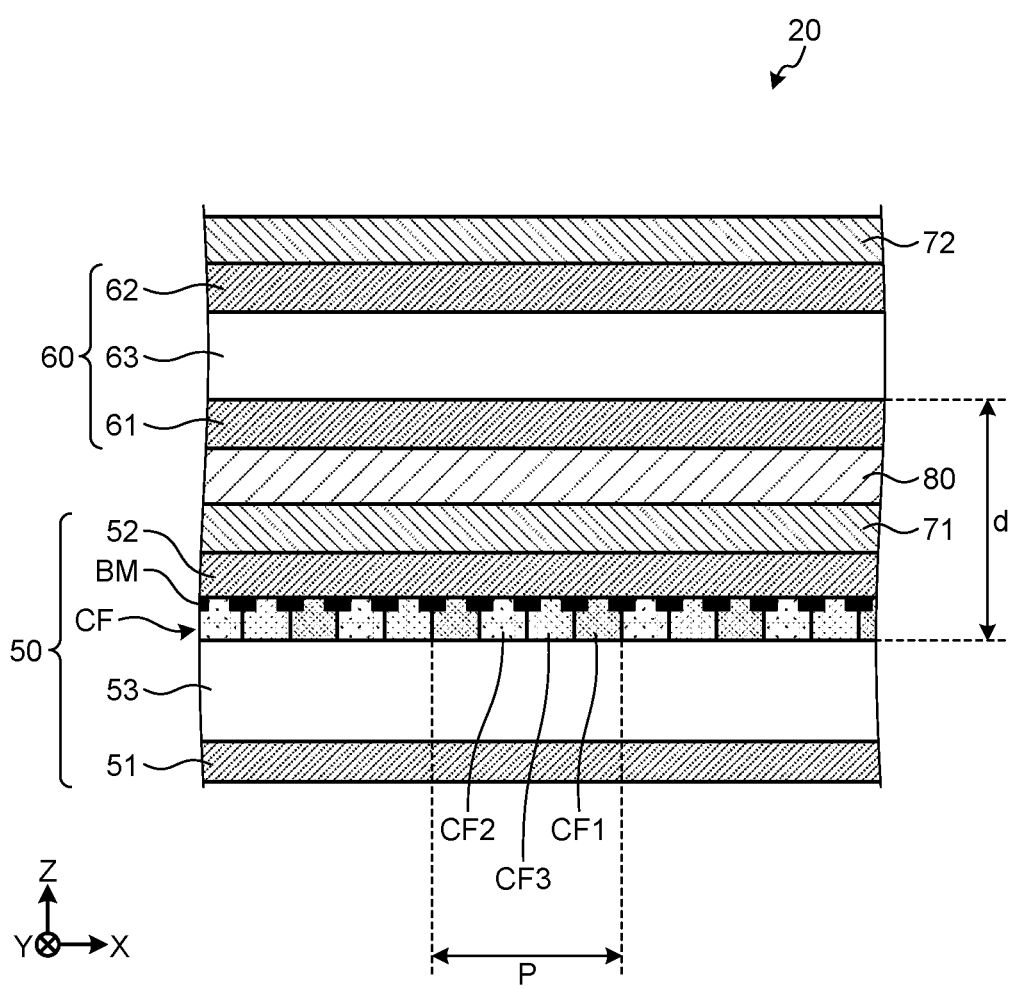
FIG. 1 is a schematic sectional view illustrating a main configuration of a display device.

FIG. 1 is a schematic sectional view illustrating a main configuration of a display device 20. The display device 20 includes a display panel 50 and a parallax formation panel 60. In the following description, the direction in which the display panel 50 and the parallax formation panel 60 are stacked is defined as a Z direction. In addition, one of two directions along a plane orthogonal to the Z direction is defined as an X direction, and the other direction is defined as a Y direction. The X direction and the Y direction are orthogonal to each other.

The display panel 50 includes a first substrate 51 and a second substrate 52. The first substrate 51 and the second substrate 52 are light-transmitting substrates such as glass substrates. The first substrate 51 and the second substrate 52 face each other in the Z direction. A liquid crystal layer 53 is sealed between the first substrate 51 and the second substrate 52. In other words, the display panel 50 is what is called a liquid crystal display panel.

A non-illustrated multilayered structure is provided on a surface of the first substrate 51 on the liquid crystal layer 53 side. The multilayered structure includes a plurality of components such as pixel electrodes individually provided for sub pixels, a common electrode shared by the sub pixels, a switching elements coupled to the respective pixel electrodes, wiring lines coupling the switching elements and a driver circuit (not illustrated) of the display device 20, and insulating layers that insulate portions to be insulated between these components. The multilayered structure includes a plurality of layers stacked to form the components. The sub pixel is, for example, any of a first sub pixel Rpix, a second sub pixel Gpix, and a third sub pixel Bpix to be described later. The first, second, and third sub pixels Rpix, Gpix, and Bpix are collectively referred to as sub pixels unless otherwise stated. The sub pixels are not limited to these specific sub pixels but are provided as appropriate corresponding to the colors of light allowed to pass through the components provided in a color filter layer CF.

A black matrix BM and the color filter layer CF are stacked on a surface on the liquid crystal layer 53 side among plate surfaces of the second substrate 52. The color filter layer CF includes a plurality of color filters. The color filters exemplarily illustrated in FIG. 1 include a first color filter CF1, a second color filter CF2, and a third color filter CF3. The first color filter CF1 allows transmission of light to be visually recognized as a first color (for example, red (R)) by a user. The second color filter CF2 allows transmission of light to be visually recognized as a second color (for example, green (G)) by the user. The third color filter CF3 allows transmission of light to be visually recognized as a third color (for example, blue (B)) by the user.

The colors of light allowed to transmit through the color filters are not limited to those described above with reference to FIG. 1 but are changeable as appropriate. The color may be, for example, cyan (C), magenta (M), yellow (Y), or any other color. A light-transmitting colorless thin film layer may be provided in place of a color filter. The color filter layer CF may include a part provided with no color filter. A part provided with a colorless thin film layer or a part provided with no color filter functions as a region that allows transmission of light in a color (for example, white (W)) corresponding to the color of light from a light source.

The shape of each color filter in plan view is a rectangular shape as exemplarily illustrated in FIG. 6 and other drawings to be described later, but is not limited thereto and is changeable as appropriate. For example, the shape of each color filter in plan view may be a polygonal shape other than a rectangular shape, and corners of the polygonal shape may be chamfered to be shaped like a straight line or a curved line. The plan-view viewpoint is a viewpoint corresponding to a plan view of viewing a plane orthogonal to the Z direction from the front.

The black matrix BM is formed between the color filter layer CF and the second substrate 52. The black matrix BM has a light-blocking property. The black matrix BM partitions the color filters in plan view. For example, the shape of the black matrix BM in plan view is a lattice shape when the shape of each color filter in plan view is a rectangular shape and the color filters are arranged in a matrix of rows and columns in the X and Y directions.

A polarization layer 71 is provided on a surface on the parallax formation panel 60 side among the plate surfaces of the second substrate 52. The polarization layer 71 is a polarization plate or polarization film that allows transmission of light polarized in a particular direction and blocks light polarized in any other direction.

The parallax formation panel 60 includes a first substrate 61 and a second substrate 62. The first substrate 61 and the second substrate 62 are light-transmitting substrates such as glass substrates. The first substrate 61 and the second substrate 62 face each other in the Z direction. A liquid crystal layer 63 is sealed between the first substrate 61 and the second substrate 62. In other words, the parallax formation panel 60 is what is called a liquid crystal display panel. However, the parallax formation panel 60 includes no color filter layer CF nor black matrix BM unlike the display panel 50.

A polarization layer 72 is provided on a surface on a user side (refer to FIG. 2) among plate surfaces of the second substrate 62. The polarization layer 72 has the same configuration as the polarization layer 71. The polarization directions of the polarization layers 71 and 72 may be the same or different from each other. The relation between the polarization directions of the polarization layers 71 and 72 depends on the configuration of the display device. The relation depends on, for example, whether the display device is a normally black type or a normally white type, or on the design related to the orientation direction of liquid crystals. In addition, a retardation layer for view angle compensation may be provided together with a plate that functions as a polarization layer.

An optical clear adhesive (OCA) 80 is provided on a surface on the display panel 50 side among plate surfaces of the first substrate 61. The OCA 80 is a light-transmitting adhesive film. The OCA 80 bonds the display panel 50 and the parallax formation panel 60. Specifically, as illustrated in FIG. 1, the OCA 80 is interposed between the polarization layer 71 and the first substrate 61 and bonds the display panel 50 provided with the polarization layer 71 to the parallax formation panel 60 including the first substrate 61.

Although not illustrated, a light source is provided on a side opposite to the parallax formation panel 60 with the display panel 50 interposed therebetween. Part or all of light from the light source reaches the user through the display device 20. The user visually recognizes an image output from the display panel 50 by visually recognizing light emitted from the light source and having passed through the display device 20.

Figure 2:
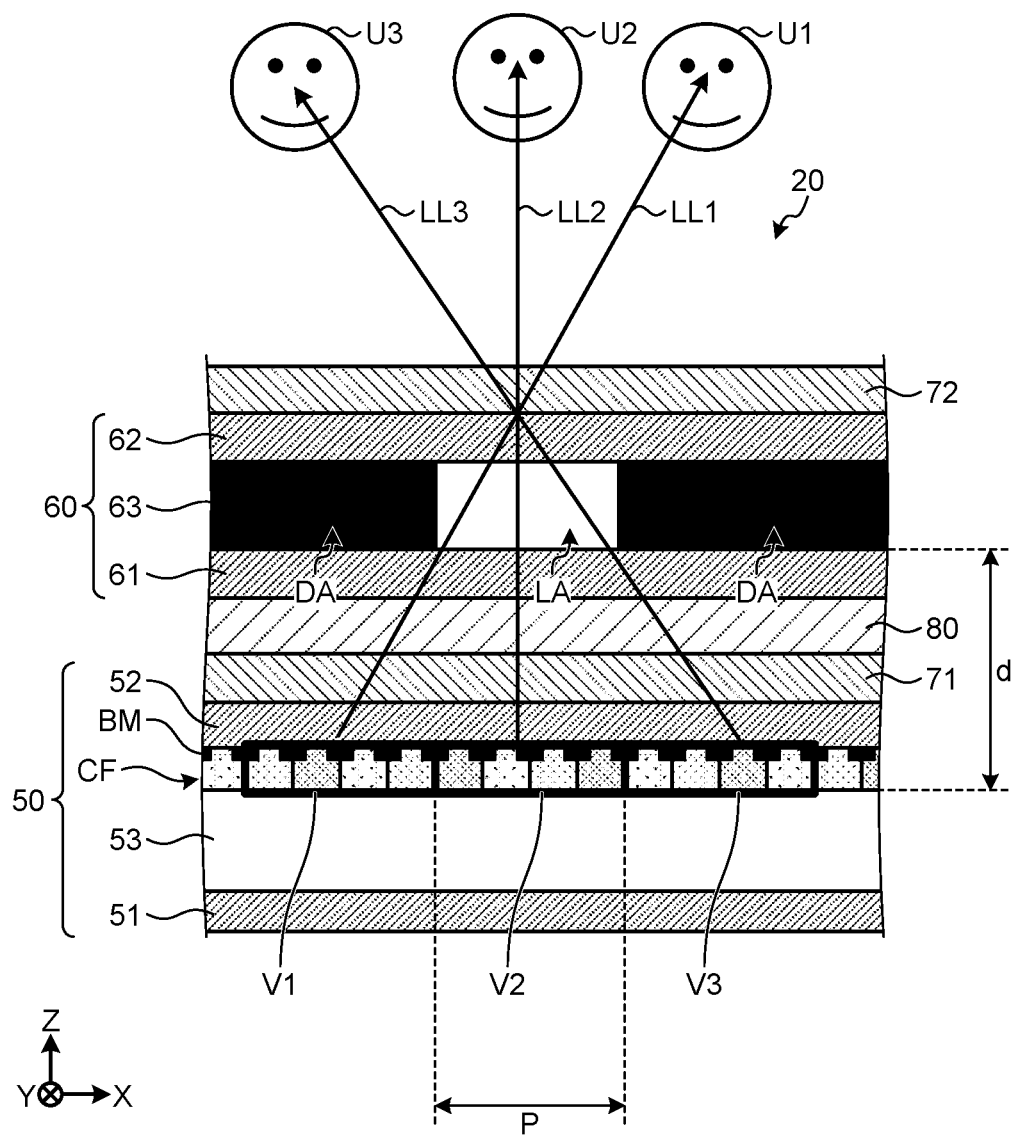
FIG. 2 is a schematic diagram illustrating multi-view output by the display device.

FIG. 2 is a schematic diagram illustrating multi-view output by the display device 20. The multi-view output is operation performed by the display device 20 to output individual images to a plurality of users (for example, viewpoints U1, U2, and U3 illustrated in FIG. 2).

As illustrated in FIG. 2, the parallax formation panel 60 is provided to be able to form light shielding regions DA and light transmitting regions LA. The light shielding regions DA completely or almost completely block light. The light transmitting regions LA completely or almost completely transmit light. Since the light shielding regions DA and the light transmitting regions LA are formed in the parallax formation panel 60, the angles of light lines LL1, LL2, and LL3 of light reaching the viewpoints U1, U2, and U3 among light emitted from the light source and having passed through the display panel 50 are limited to the angles of light passing through the light transmitting regions LA.

FIG. 2 illustrates the light line LL1 of light reaching the viewpoint U1 through a color filter positioned in a region V1 in the color filter layer CF, the light line LL2 of light reaching the viewpoint U2 through a color filter positioned in a region V2 in the color filter layer CF, and the light line LL3 of light reaching the viewpoint U3 through a color filter positioned in a region V3 in the color filter layer CF. The light line LL2 extends in the Z direction. The light line LL1 is tilted to one side in the X direction relative to the Z direction. The light line LL3 is tilted to the other side in the X direction relative to the Z direction. The regions V1, V2, and V3 are arranged in the X direction. This indicates that the display device 20 can output different images to each of the viewpoints U1, U2, and U3 when an image that is output by using a sub pixel including the color filter positioned in the region V1, an image that is output by using a sub pixel including the color filter positioned in the region V2, and an image that is output by using a sub pixel including the color filter positioned in the region V3 are individual images. The multi-view output by the display device 20 is achieved by such control of sub pixels.

Figure 3:
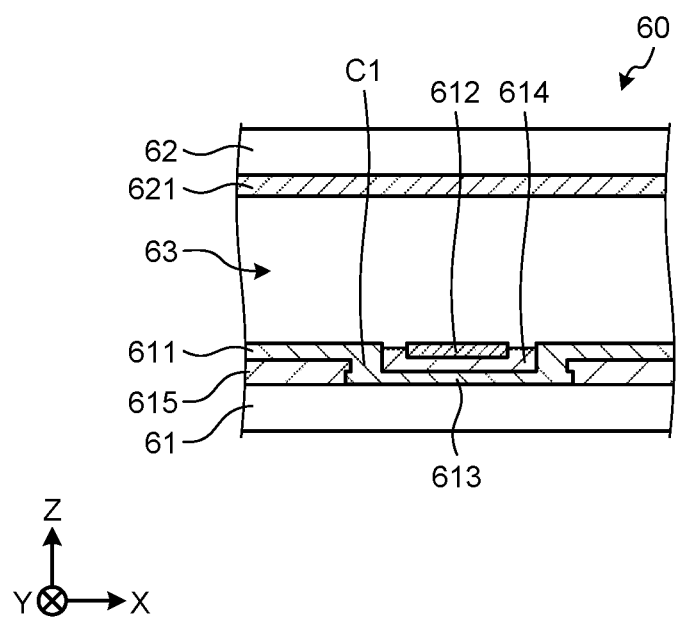
FIG. 3 is a schematic sectional view illustrating an exemplary main configuration of a parallax formation panel.
Figure 4:
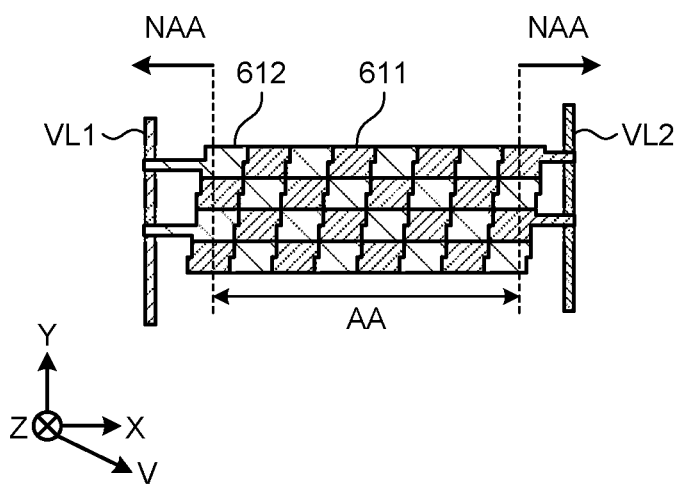
FIG. 4 is a schematic diagram illustrating an exemplary arrangement and shapes of electrodes 611 and electrodes 612 in plan view.
Figure 5:
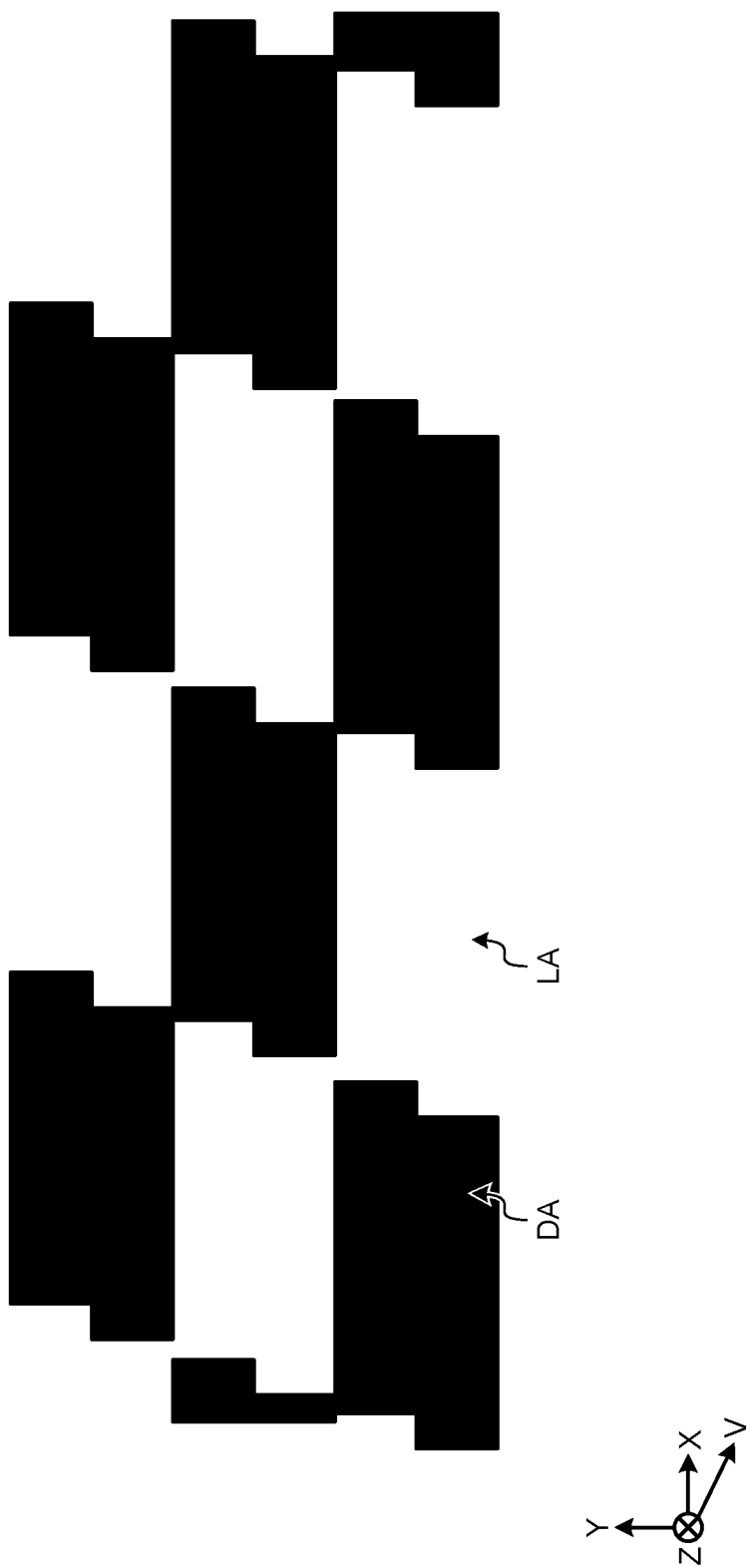
FIG. 5 is a schematic diagram illustrating a state in which regions overlapping the electrodes 611 or the electrodes 612 in plan view are light shielding regions of the parallax formation panel and regions overlapping the other electrodes in plan view are light transmitting regions of the parallax formation panel.

The following describes an exemplary mechanism that the parallax formation panel 60 forms the light shielding regions DA and the light transmitting regions LA with reference to FIGS. 3 to 5.

FIG. 3 is a schematic sectional view illustrating an exemplary main configuration of the parallax formation panel 60. The parallax formation panel 60 includes, for example, a multilayered structure formed on a surface on the liquid crystal layer 63 side among the plate surfaces of the first substrate 61. The multilayered structure includes the first substrate 61, electrodes 611, electrodes 612, a wiring layer 613, an insulating layer 614, and an insulating layer 615. The multilayered structure is provided to be able to apply individual potentials to the electrodes 611 and 612.

FIG. 4 is a schematic diagram illustrating an exemplary arrangement and shapes of the electrodes 611 and 612 in plan view. As illustrated in FIG. 4, the electrodes 611 and 612 are arranged at staggered positions in the X and Y directions. As more clearly illustrated in FIG. 5 to be described later, the electrodes 611 and 612 are continuous in one of directions intersecting the X and Y directions. In FIGS. 4 and 5, the one direction is illustrated as a V direction.

As illustrated in FIG. 4, the electrodes 611 are coupled to a potential line VL2. The electrodes 612 are coupled to a potential line VL1. The potential lines VL1 and VL2 are provided in a non-display region NAA positioned outside a display region AA. The display region AA is a region in which an image is output in the display device 20. The non-display region NAA is a region in which no image is output in the display device 20.

Individual potentials can be provided to the potential lines VL1 and VL2. The potential of the electrodes 611 corresponds to potential applied to the potential line VL2. The potential of the electrodes 612 corresponds to potential applied to the potential line VL1.

An electrode 621 is formed on a surface on the liquid crystal layer 63 side among the plate surfaces of the second substrate 62 in the parallax formation panel 60 illustrated in FIG. 3. The electrode 621 is a thin film electrode facing the electrodes 611 and 612 in the display region AA (refer to FIG. 4). Predetermined potential is applied to the electrode 621.

The parallax formation panel 60 described above with reference to FIGS. 3 and 4 is what is called a twisted nematic (TN) liquid crystal display panel. When an electrode (electrode 611 or 612) at a position facing the electrode 621 with the liquid crystal layer 63 interposed therebetween is equipotential to the electrode 621, the orientation of liquid crystal molecules between the facing electrode and the electrode 621 becomes an orientation with which the polarization direction of light is changed to allow light to be transmitted through the polarization layers 71 and 72 at the maximum. Thus, the light transmitting regions LA are formed. When the potential of the electrode (electrode 611 or 612) at the position facing the electrode 621 with the liquid crystal layer 63 interposed therebetween is different from that of the electrode 621, the orientation of liquid crystal molecules positioned between the facing electrode and the electrode 621 becomes an orientation with which light cannot be transmitted through the polarization layer 72 or with which the degree of light transmission is less than maximum. Thus, the light shielding regions DA are formed.

FIG. 5 is a schematic diagram illustrating a state in which regions overlapping the electrodes 611 or the electrodes 612 in plan view are the light shielding regions DA in the parallax formation panel 60 and regions overlapping the other electrodes in plan view are the light transmitting regions LA in the parallax formation panel 60. Since the electrodes 611 and 612 are continuous in the V direction as described above with reference to FIG. 4, the light shielding regions DA and the light transmitting regions LA are continuous in the V direction. The electrodes 611 are coupled to the wiring layer 613 through a contact C1 as illustrated in FIG. 3. The electrodes 611 arranged in the X direction are electrically continuous through the contact C1 and the wiring layer 613. Although not illustrated, the electrodes 612 arranged in the X direction are electrically continuous in the same configuration.

The following describes the size of each light transmitting region LA surrounded by the light shielding regions DA and control of a pixel signal provided to a corresponding sub pixel visually recognizable through the light transmitting region LA. As illustrated in FIGS. 1 and 2, a distance d is defined as the distance between an interface of the liquid crystal layer 53 on the parallax formation panel 60 side and an interface of the liquid crystal layer 63 on the first substrate 61 side. The distance d corresponds to a width P and the assumed number of output images in the multi-view output, in other words, the assumed number of users who simultaneously visually recognizes images output from the display device 20. The width P corresponds to the size of each light transmitting region LA in the X direction and the number of sub pixels visually recognizable at one viewpoint through the light transmitting region LA.

Figure 6:
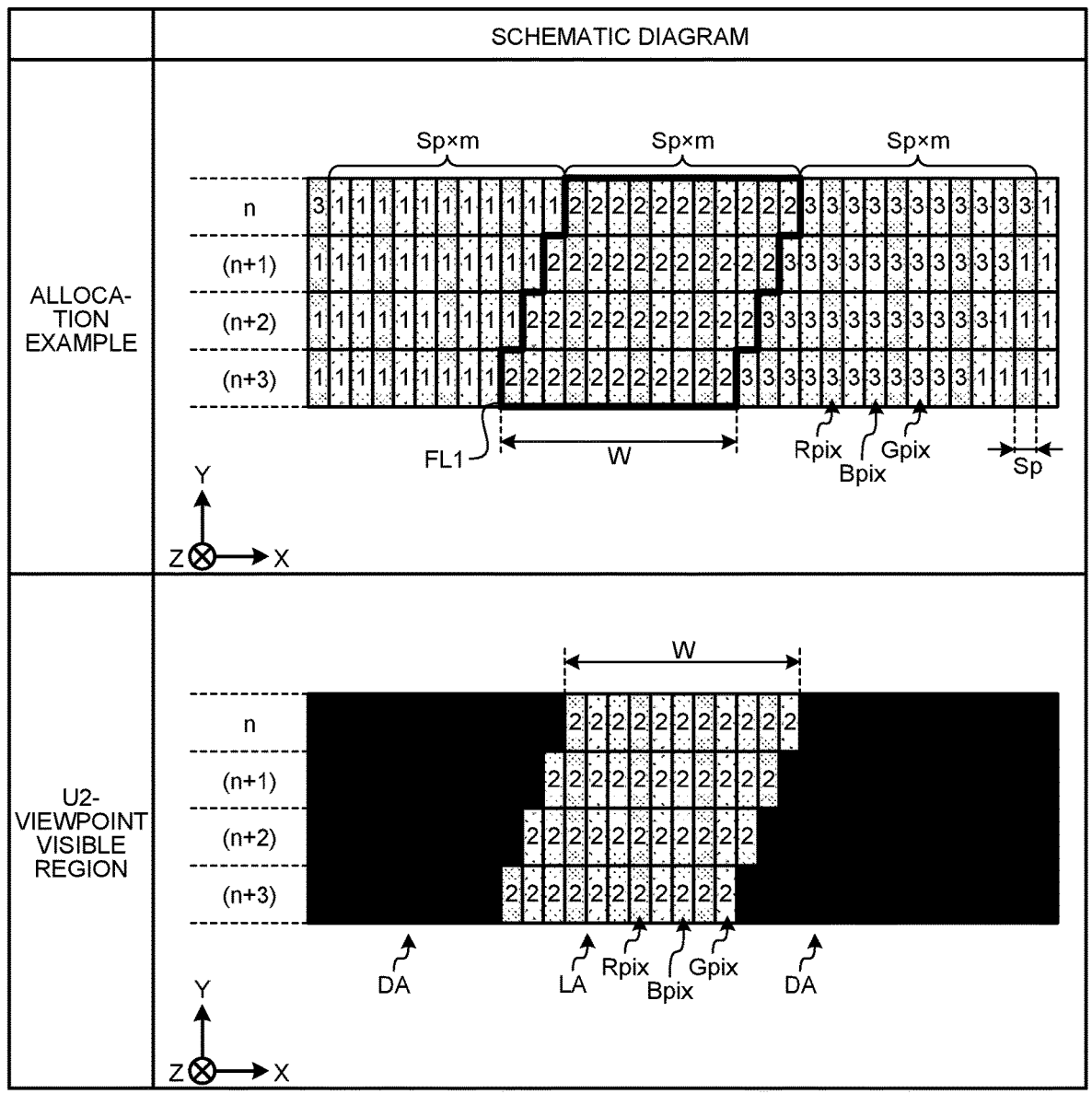
FIG. 6 is a diagram illustrating an exemplary correspondence relation between the width of each of the light transmitting regions and the number of sub pixels visually recognizable through the light transmitting region.

FIG. 6 is a diagram illustrating an exemplary correspondence relation between a width W of one light transmitting region LA and the number of sub pixels visually recognizable at the one light transmitting region LA. FIG. 6 selectively illustrates an area including four "sub-pixel rows" arranged in the Y direction, each sub-pixel row being made up of a plurality of sub pixels arranged in the X direction among a plurality of sub pixels included in the display panel 50 and arranged in a matrix of rows and columns in the display region AA. Hereinafter, a row means a "sub-pixel row" unless otherwise stated. In addition, a column means a "sub-pixel column" made up of a plurality of sub pixels arranged in the Y direction unless otherwise stated.

The first sub pixel Rpix illustrated in FIG. 6 and other drawings is a sub pixel provided with the first color filter CF1 positioned on the line of light visually recognized by a user (for example, any of the viewpoints U1, U2, and U3). The second sub pixel Gpix is a sub pixel provided with the second color filter CF2 positioned on the line of light visually recognized by a user (for example, any of the viewpoints U1, U2, and U3). The third sub pixel Bpix is a sub pixel provided with the third color filter CF3 positioned on the line of light visually recognized by a user (for example, any of the viewpoints U1, U2, and U3). In FIG. 6 and other drawings illustrating the arrangement of the sub pixels and numbers indicating users visually recognizing the sub pixels, the reference sign of Rpix for the first sub pixel is assigned to only one rectangular region, the reference sign of Gpix for the second sub pixel is assigned to another one rectangular region, and the reference sign of Bpix for the third sub pixel is assigned to another one rectangular region. However, each rectangular region illustrated with the same dot pattern can be assigned the same reference sign.

Sub-pixel rows n, (n+1), (n+2), and (n+3) illustrated in FIG. 6 and other drawings are four sub-pixel rows arranged in the Y direction, which are selected from among a plurality of sub-pixel rows included in the display device 20. Hereinafter, a row means a sub-pixel row unless otherwise stated. The first sub pixel Rpix, the second sub pixel Gpix, and the third sub pixel Bpix are periodically arranged in each row in the X direction. In FIG. 6, the sub pixels are periodically arranged in the order of the second sub pixel Gpix, the third sub pixel Bpix, and the first sub pixel Rpix from one side of each row in the X direction toward the other side, but this arrangement order is merely exemplary and not restrictive and thus is changeable as appropriate. In examples illustrated in FIG. 6 and other drawings, sub pixels of the same kind are arranged in the Y direction. In other words, the colors of sub pixels are uniform for each sub-pixel column. Hereinafter, a column means a sub-pixel column unless otherwise stated.

Image display output is performed when pixel signals based on image data that is input from the outside to the display device 20 are provided to the sub pixels, and the degrees of light transmitted through the sub pixels are controlled in accordance with gradation values indicated by the pixel signals, whereby an image is displayed and outputted.

Specifically, the degree of light transmitted through the sub pixel corresponds to the orientation of liquid crystal molecules included in the liquid crystal layer 53. The orientation of liquid crystal molecules included in the liquid crystal layer 53 is controlled in accordance with the potential difference between the pixel electrode and the common electrode included in a circuit formation layer 511. The pixel electrode is individually provided for each sub pixel. The common electrode is shared by the sub pixels. The pixel signal is individually provided to each pixel electrode, and the potential of the pixel electrode is set in accordance with the strength of the pixel signal. Thus, the orientation of liquid crystal molecules between the pixel electrode of each sub pixel and the color filter layer CF is controlled.

In FIG. 6 and other drawings, a sub pixel positioned on the line (for example, light line LL1 illustrated in FIG. 2) of light visually recognized at the viewpoint U1 is assigned "1". A sub pixel positioned on the line (for example, light line LL2 illustrated in FIG. 2) of light visually recognized at the viewpoint U2 is assigned "2". A sub pixel positioned on the line (for example, light line LL3 illustrated in FIG. 2) of light visually recognized at the viewpoint U3 is assigned "3". Which sub pixel is visually recognized at which viewpoint is determined in accordance with the relation between the distance d and the width P and arrangement of the light transmitting regions LA and the light shielding regions DA described above. In other words, which sub pixel is visually recognized at which viewpoint is predetermined. The driver circuit of the display device 20 described above provides a pixel signal corresponding to an image visually recognized at the viewpoint U1 to a sub pixel "1", provides a pixel signal corresponding to an image visually recognized at the viewpoint U2 to a sub pixel "2", and provides a pixel signal corresponding to an image visually recognized at the viewpoint U3 to a sub pixel "3". The "allocation example" illustrated in FIG. 6 and other drawings schematically illustrates the correspondence relation between the arrangement of the sub pixels in plan view and the viewpoints at which the sub pixels are visually recognized (and the pixel signals allocated in accordance with the viewpoints).

As illustrated in FIG. 6, the width of each sub pixel in the X direction is a width Sp. The width P described above with reference to FIG. 2 is the width of m sub pixels arranged in the X direction. The number m is 11 in an example illustrated in FIG. 6 and other drawings but is not limited thereto and may be set to a desired natural number in accordance with a required width P. Thus, each row includes a region in which 11 sub pixels assigned the same number among "1", "2", and "3" are continuous in the X direction. In the "allocation example" in FIG. 6, such a region in the n-th row is assigned "Sp×m". An opening width of each light transmitting region LA in the X direction corresponds to the width (Sp×m) of the region in the X direction. Thus, the width W of each light transmitting region LA illustrated in FIG. 6 corresponds to the width P, in other words, "Sp×m".

The width P, in other words, the width corresponding to "Sp×m" means a width equal to or smaller than Sp×m, and precisely, a width slightly smaller than Sp×m. When the plurality of light transmitting regions LA arranged in the X direction are viewed from one viewpoint, the way of overlapping between a sub pixel and the light transmitting region LA in plan view is different between the light transmitting region LA on a light line along which the viewpoint and a sub pixel face each other in the Z direction and the light transmitting region LA on a light line along which the viewpoint and a sub pixel face each other in a direction intersecting the Z direction. Specifically, when an assumed viewpoint is set as a center, the light transmitting region LA is positioned closer to the center in plan view than a sub pixel visually recognized through the light transmitting region LA is. When such arrangement of the light transmitting regions LA is to be achieved, assuming that the unit length of the light transmitting regions LA and the light shielding regions DA is equal to Sp×m, the light transmitting region LA is located at a position completely overlapping a visually recognized sub pixel in plan view and is farther from the center than the visually recognized sub pixel is. Thus, with the position of an assumed viewpoint as a center, the width of each light transmitting region LA is set to a width slightly smaller than Sp×m so that the light transmitting region LA is closer to the center in plan view than a sub pixel visually recognized through the light transmitting region LA is. With this configuration, the light transmitting regions LA having such a slightly smaller width are repeatedly arranged, whereby, as the position is further away from the center, each light transmitting region LA is positioned closer to the center in plan view than a sub pixel visually recognized through the light transmitting region LA is.

As illustrated with the light transmitting regions LA in the "U2-viewpoint visible region" in FIG. 6, the positions of the light transmitting regions LA on adjacent rows are shifted from each other by one sub pixel in the X direction. Moreover, the arrangement of the light transmitting regions LA in the X direction is different between two rows facing each other in the Y direction with a row interposed therebetween. Specifically, in the example illustrated in FIG. 6, the boundary between the light transmitting region LA and the light shielding region DA has a stepped shape. As illustrated in the "allocation example" in FIG. 6, the pixel signal allocation corresponds to such a boundary between the light transmitting region LA and the light shielding region DA. Specifically, regions FL1 each including sub pixels visually recognizable at one viewpoint has a stepped shape in plan view. In the "U2-viewpoint visible region", sub pixels visually recognizable at the viewpoint U2 through the light transmitting regions LA are illustrated. Although not illustrated, sub pixels "1" in the "allocation example" are visually recognizable at the viewpoint U1 through the light transmitting regions LA. In addition, sub pixels "3" in the "allocation example" are visually recognizable at the viewpoint U3, through the light transmitting regions LA.

The light transmitting regions LA and the light shielding regions DA in each row are periodically arranged in the X direction. Specifically, the light transmitting region LA having a width (the width P) corresponding to the above-described "Sp×m" in the X direction and the light shielding region DA having a width obtained by multiplying the width of the light transmitting region LA in the X direction by a "number obtained by subtracting one from the number of viewpoints" are alternately arranged in the X direction in each row. For example, when the number of viewpoints is three as described above with reference to FIGS. 2 and 6, the width of each light shielding region DA in each row in the X direction is twice the width of each light transmitting region LA in the X direction.

The regions FL1 and the light transmitting regions LA illustrated in FIG. 6 may be continuous by an arbitrary length in the Y direction. As described above with reference to FIG. 6, in an image visually recognized at a viewpoint through a visible region having a vertical strip shape in which the plurality of light transmitting regions LA that are each continuous in a stepped shape in an oblique direction are arranged in the X direction, the perceived resolution is spoiled. This is because the light transmitting regions LA, which are visually recognized as brighter regions than the light shielding regions DA, are continuous in the oblique direction and thus are not recognized as bright dots. The oblique direction is a direction intersecting the X and Y directions in plan view and is the direction in which the light transmitting regions LA are continuous in a stepped shape.

Thus, in an embodiment, the arrangement of the light transmitting regions LA and the light shielding regions DA is contrived to improve the perceived resolution of an image. The following describes, with reference to FIG. 7 and the subsequent drawings, the arrangement of the light transmitting regions LA and the light shielding regions DA with which the perceived resolution of an image can be improved as compared to the example described above with reference to FIG. 6, and an allocation example of pixel signals corresponding to the light transmitting regions LA. When a sub pixel is assigned any of "1", "2", and "3" in FIG. 7 and the subsequent drawings, the intention of the denotation is the same as described above with reference to FIG. 6.

Figure 7:
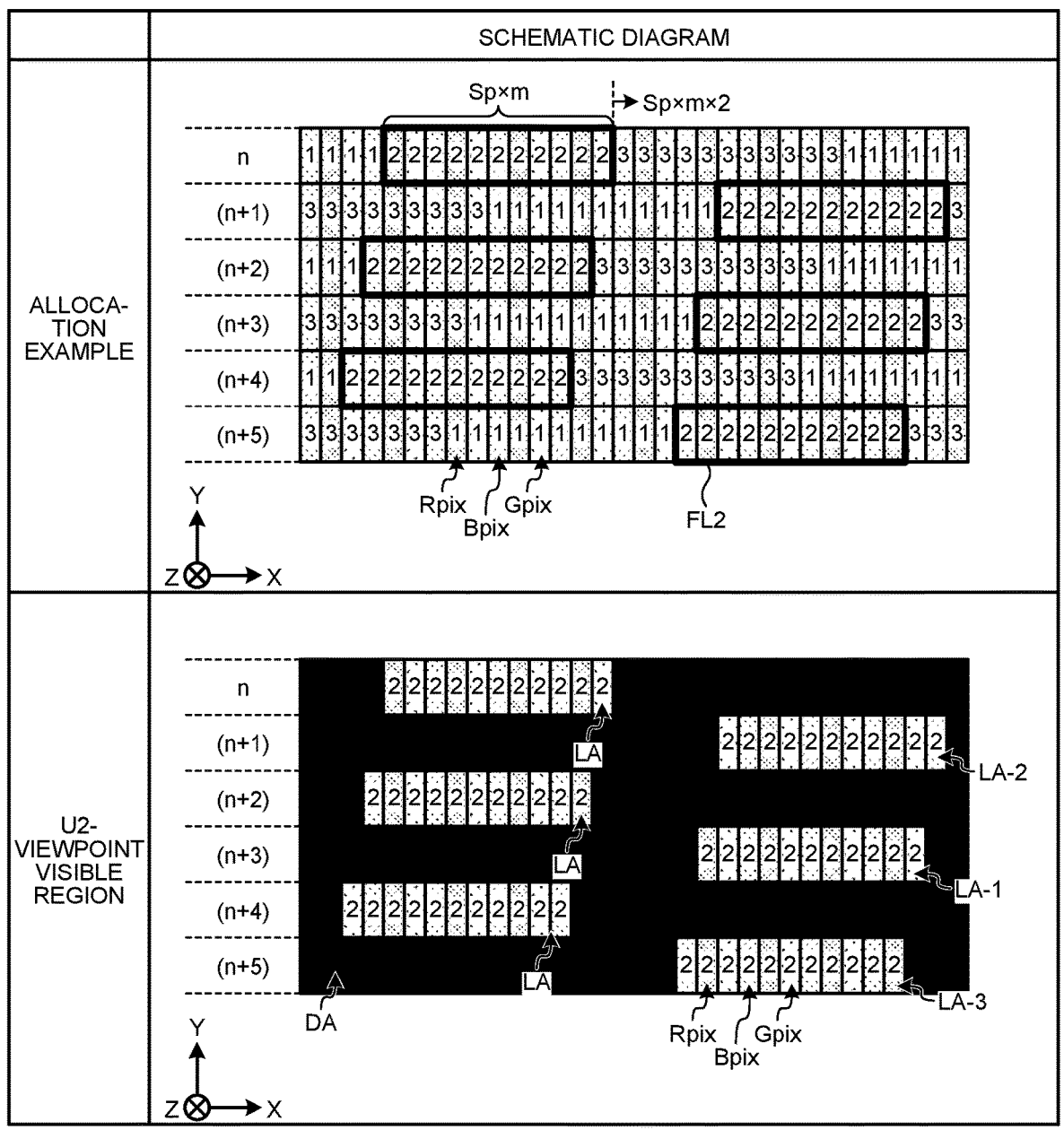
FIG. 7 is a diagram illustrating an exemplary correspondence relation between light transmitting regions and light shielding regions in an embodiment and the number of sub pixels visually recognizable through the light transmitting regions.

FIG. 7 is a diagram illustrating an exemplary correspondence relation between the light transmitting regions LA and the light shielding regions DA in the embodiment and the number of sub pixels visually recognizable through the light transmitting regions LA. The number "Sp×m" in the "allocation example" in FIG. 7 and other drawings is the same as that described above with reference to FIG. 6 and indicates the number of sub pixels that are arranged in the X direction and visually recognizable at one viewpoint (for example, the viewpoint U2) through the light transmitting regions LA. The number "Sp×m×2" in the "allocation example" in FIG. 7 and other drawings indicates the number of sub pixels that are arranged in the X direction and not visually recognizable at the one viewpoint.

As illustrated in the "U2-viewpoint visible region" in FIG. 7, the plurality of light transmitting regions LA in the embodiment are separated from each other in the Y direction by the light shielding regions DA. The X-directional width of each light transmitting region LA corresponds to the width P, in other words, "Sp×m". The Y-directional width of each light transmitting region LA corresponds to one row. The Y-directional width of each light shielding region DA interposed between light transmitting regions LA adjacent to each other in the Y direction corresponds to one row. The X-directional arrangement of light transmitting regions LA adjacent to each other in the Y direction has a shift by one sub pixel in the X direction. As for the positional relation of two light transmitting regions LA (for example, a light transmitting region LA-2 and a light transmitting region LA-3 in FIG. 7) facing each other in the Y direction with one light transmitting region LA (for example, a light transmitting region LA-1 in FIG. 7) interposed therebetween, the direction of shift of the light transmitting region LA-2 relative to the light transmitting region LA-1 in the X direction is different from the direction of shift of the light transmitting region LA-3 relative to the light transmitting region LA-1 in the X direction.

The X-directional arrangement of the light transmitting regions LA illustrated in FIG. 7 is the same as the X-directional arrangement of the light transmitting regions LA described above with reference to FIG. 6 in that the light transmitting regions LA having a width (the width P) corresponding to "Sp×m" in the X direction and the light shielding regions DA having a width obtained by multiplying the width of the light transmitting region LA in the X direction by a "number obtained by subtracting one from the number of viewpoints" are alternately arranged in the X direction in each row. However, the X-directional distance between a light transmitting region LA provided in one of two rows adjacent to each other and a light transmitting region LA provided in the other row corresponds to a sub pixels or (α+1) sub pixels. The number a is a value obtained by rounding off, to the closest whole number, a value obtained by dividing the value of "Sp×m" by two. In FIG. 7, each light transmitting region LA positioned in the n-th row is shifted from the corresponding light transmitting region LA positioned in the (n+1)th row by five sub pixels in the X direction. In FIG. 7, each light transmitting region LA positioned in the (n+1)th row is shifted from the corresponding light transmitting region LA positioned in a (n+2)th row by six sub pixels in the X direction. The shift by five sub pixels and the shift by six sub pixels alternately occur to the arrangement of the light transmitting regions LA in subsequent rows of the (n+3)th row, the (n+4)th row, . . . . Each light transmitting region LA disposed as described above is surrounded by the light shielding regions DA.

The pixel signal allocation to the sub pixels corresponds to the arrangement of the light transmitting regions LA. As illustrated in the "allocation example" in FIG. 7, the arrangement of the regions FL2 each including sub pixels visually recognizable at one viewpoint (for example, the viewpoint U2) is the same as the arrangement of the light transmitting regions LA described above with reference to the "U2-viewpoint visible region" in FIG. 7.

In the embodiment described above with reference to FIG. 7, the light transmitting regions LA are separated, row by row, from each other in the Y direction. An image visually recognized at each viewpoint through such light transmitting regions LA in the embodiment is visually recognized as an image having a perceived resolution higher than an image visually recognized at each viewpoint through the light transmitting regions LA that are continuous in an oblique direction in the above description with reference to FIG. 6.

Since two light transmitting regions LA adjacent to each other in the Y direction are shifted from each other by one sub pixel in the X direction, it is possible to more reliably reduce the occurrence of color deviation in each of images visually recognizable at the respective viewpoints. In particular, with such arrangement of the light transmitting regions LA, it is possible to more reliably reduce the occurrence of color deviation in images visually recognizable at the respective viewpoints even when the colors of sub pixels arranged in the Y direction are uniform as in the embodiment.

The light transmitting regions LA completely surrounded by the light shielding regions DA as described above with reference to the "U2-viewpoint visible region" in FIG. 7 are difficult to achieve with the positional relation between the light transmitting regions LA and the light shielding regions DA described above with reference to FIGS. 4 and 5. The following describes, with reference to FIGS. 8 to 11, the shapes of electrodes in parallax formation panels 60A and 60B with which the light transmitting regions LA completely surrounded by the light shielding regions DA can be achieved.

Figure 8:
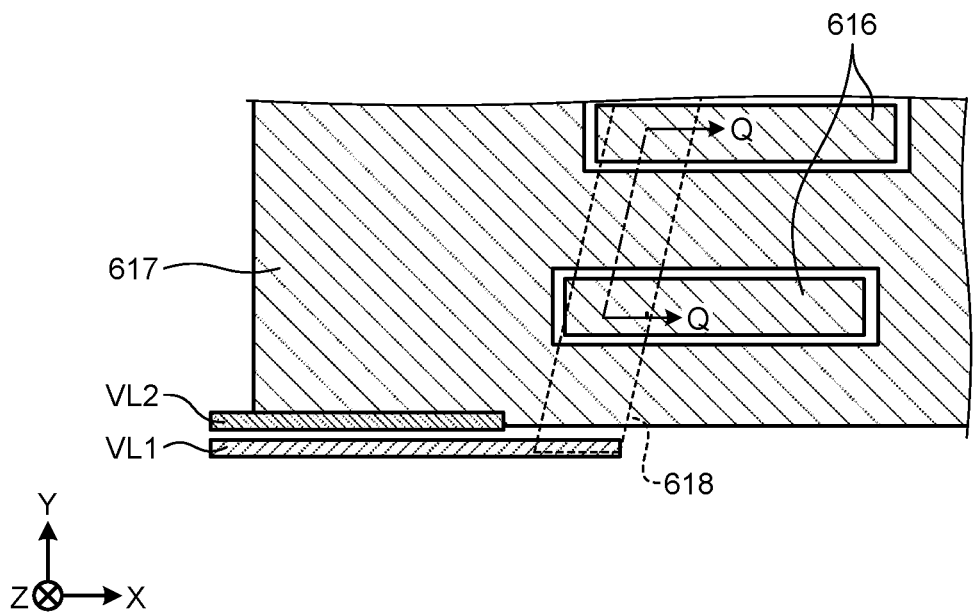
FIG. 8 is a schematic diagram illustrating an exemplary arrangement and shapes of first electrodes and a second electrode in plan view.
Figure 9:
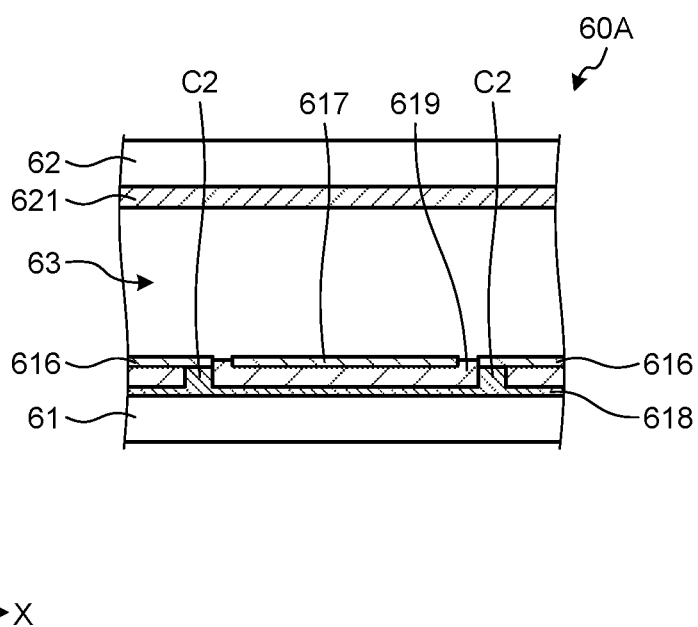
FIG. 9 is a Q-Q sectional view of a parallax formation panel including the first electrodes and the second electrode illustrated in FIG. 8.

FIG. 8 is a schematic diagram illustrating an exemplary arrangement and shapes of first electrodes 616 and a second electrode 617 in plan view. FIG. 9 is a Q-Q sectional view of the parallax formation panel 60A including the first electrodes 616 and the second electrode 617 illustrated in FIG. 8. In the embodiment, the first electrodes 616, the second electrode 617, a wiring layer 618, an insulating layer 619, and the electrode 621 illustrated in FIG. 9 are provided in place of the electrodes 611 and 612, the wiring layer 613, the insulating layer 614, and the insulating layer 615 described above with reference to FIG. 3.

As illustrated in FIG. 8, the first electrodes 616 are separately positioned in shapes and an arrangement corresponding to the arrangement of the light transmitting regions LA in plan view (refer to FIG. 7, for example). The second electrode 617 has a shape outlining the first electrodes 616 in plan view. Each first electrode 616 and the second electrode 617 do not contact each other with a gap therebetween. Each first electrode 616 is coupled to the wiring layer 618 through a contact C2 as illustrated in FIG. 9. The insulating layer 619 at which the contacts C2 are provided insulates the second electrode 617 from the wiring layer 618. The electrode 621 is provided on the second substrate 62 side and faces the first electrodes 616 and the second electrode 617 with the liquid crystal layer 63 interposed therebetween.

As illustrated in FIG. 8, the wiring layer 618 is coupled to the potential line VL1. The second electrode 617 is coupled to the potential line VL2. Thus, the light transmitting regions LA and the light shielding regions DA described above with reference to FIG. 7 can be achieved by setting the potential of the potential line VL1 to a value equal to the potential of the electrode 621 and setting the potential of the potential line VL2 to a value different from the potential of the electrode 621.

Figure 10:
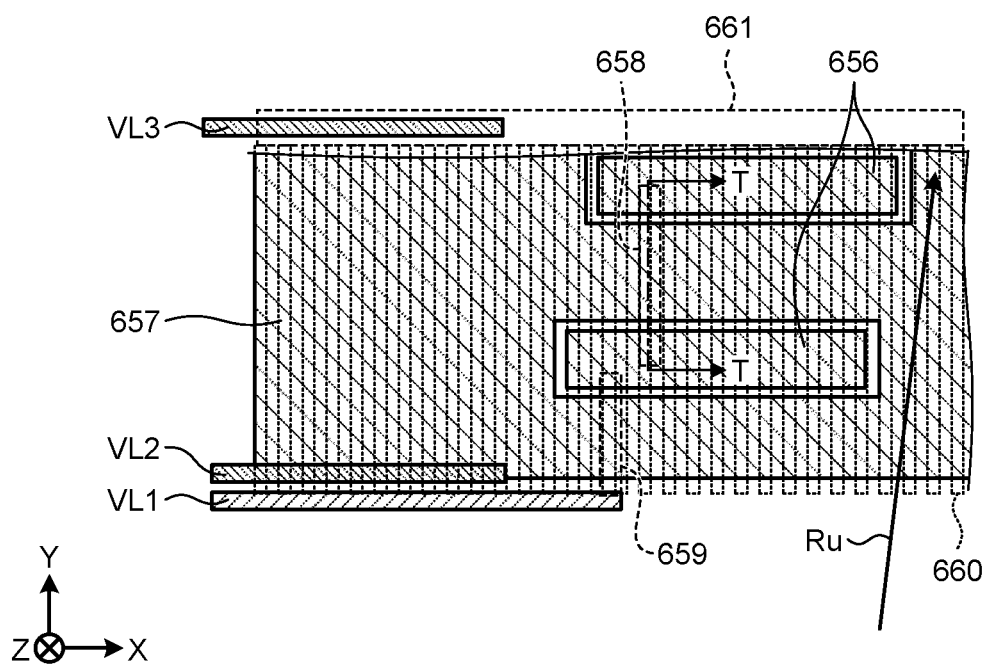
FIG. 10 is a schematic diagram illustrating an exemplary arrangement and shapes of electrodes in plan view with which the light transmitting regions and the light shielding regions in FIG. 7 are achieved in a form different from that in FIG. 8.

FIG. 10 is a schematic diagram illustrating an exemplary arrangement and shapes of electrodes in plan view with which the light transmitting regions LA and the light shielding regions DA in FIG. 7 are achieved in a form different from that in FIG. 8. The shapes and arrangement of a plurality of first electrodes 656 illustrated in FIG. 10 in plan view are the same as those of the first electrodes 616 described above with reference to FIG. 8. The shape and arrangement of a second electrode 657 illustrated in FIG. 10 in plan view are the same as those of the second electrode 617 described above with reference to FIG. 8. However, unlike the configuration described above with reference to FIG. 8, each first electrodes 656 is coupled to the potential line VL1 through a wiring layer 658 and a wiring layer 659. The wiring layer 658 couples two first electrodes 656 adjacent to each other in the Y direction. The wiring layer 659 couples the potential line VL1 and one of the wiring layers 658.

Figure 11:
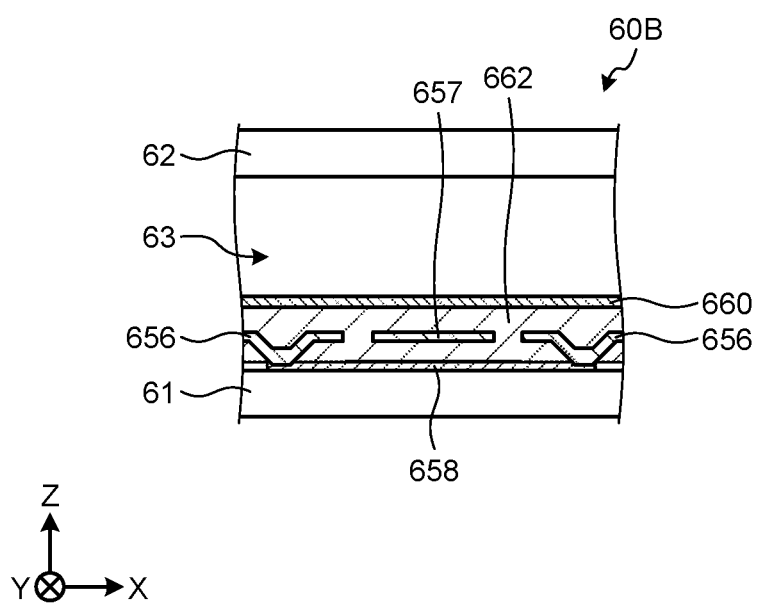
FIG. 11 is a T-T sectional view of the parallax formation panel including the first electrodes and the second electrode illustrated in FIG. 8 and described with reference to FIG. 10.

FIG. 11 is a T-T sectional view of the parallax formation panel 60B including the first electrodes 656 and the second electrode 657 illustrated in FIG. 8 and described above with reference to FIG. 10. The configuration illustrated in FIG. 11 corresponds to a liquid crystal panel in the system of using a horizontal electric field or a fringe electric field. A direction Ru illustrated with an arrow in FIG. 10 represents the rubbing direction of the liquid crystal panel, in other words, the initial orientation of liquid crystal molecules included in the liquid crystal layer 63. The direction Ru intersects the X and Y directions. In a specific example, the direction Ru is tilted by 10° to 20° relative to the Y direction.

The parallax formation panel 60B includes a third electrode 660 facing the first electrodes 656 and the second electrode 657 with an insulating layer 662 interposed therebetween. The third electrode 660 has a stripe structure in which a plurality of electrodes extending in one direction (for example, the Y direction) are arranged in a direction (for example, the X direction) orthogonal to the one direction. The third electrode 660 is coupled to a potential line VL3 through a coupling part 661 provided on one end side in the extending direction of the electrodes. With this configuration, the potential of the electrodes arranged in a stripe shape as the third electrode 660 is equal to the potential of the potential line VL3. In the parallax formation panel 60B, no electrode is provided on the second substrate 62 side. In the parallax formation panel 60B, the light transmitting regions LA and the light shielding regions DA described above with reference to FIG. 7 can be achieved by setting the potential of the potential line VL1 to a value different from the potential of the third electrode 660 and setting the potential of the potential line VL2 to a value equal to the third electrode 660.

In the embodiment in which the light transmitting regions LA and the light shielding regions DA described above with reference to FIG. 7 are formed, the configuration of the parallax formation panel 60 in FIGS. 1 and 2 is replaced with a configuration, like the parallax formation panel 60A or the parallax formation panel 60B, in which the light transmitting regions LA completely surrounded by the light shielding regions DA can be achieved.

In the embodiment, the light transmitting regions LA corresponding to electrodes having an X-directional width longer than a Y-directional length thereof like the first electrodes 616 or 656 are formed. Specifically, the width of each first electrode (for example, first electrode 616 or 656) in a first direction (for example, the X direction) is longer than the length thereof in a second direction (for example, the Y direction). The first direction is an arrangement direction of a plurality of viewpoints (for example, the viewpoints U1, U2, and U3), and the second direction is a direction orthogonal to the arrangement direction of the viewpoints and extending along a display surface of a display panel (for example, the display panel 50). With this configuration, the perceived resolution of an image can be more easily improved.

Modifications

The shapes, in plan view, of the light transmitting regions LA and the light shielding regions DA in a display device capable of achieving a perceived resolution higher than that of the configuration described above with reference to FIG. 6, are not limited to those in the example described above with reference to FIG. 7. The following describes, with reference to FIGS. 12 to 22, modifications of the embodiment different from the example described above with reference to FIG. 7. In each modification, unless otherwise stated, electrodes (for example, either the electrodes 611 or 612, the first electrodes 616, or the first electrodes 656) corresponding to the shapes of the light transmitting regions LA are not electrically coupled to electrodes (for example, the others of the electrodes 611 and 612, the second electrodes 617, or the second electrodes 657) corresponding to the shapes of the light shielding regions DA, in the parallax formation panel 60 (or the parallax formation panel 60A, or the parallax formation panel 60B). In other words, in each modification, the shapes and arrangement of either the electrodes 611 or 612, the first electrodes 616, or the first electrodes 656 in plan view correspond to the shapes and arrangement of the light transmitting regions LA in plan view. Moreover, in each modification, the shapes and arrangement of the others of the electrodes 611 and 612, the second electrodes 617, or the second electrodes 657 in plan view correspond to the shapes and arrangement of the light shielding regions DA in plan view.

First Modification

Figure 12:
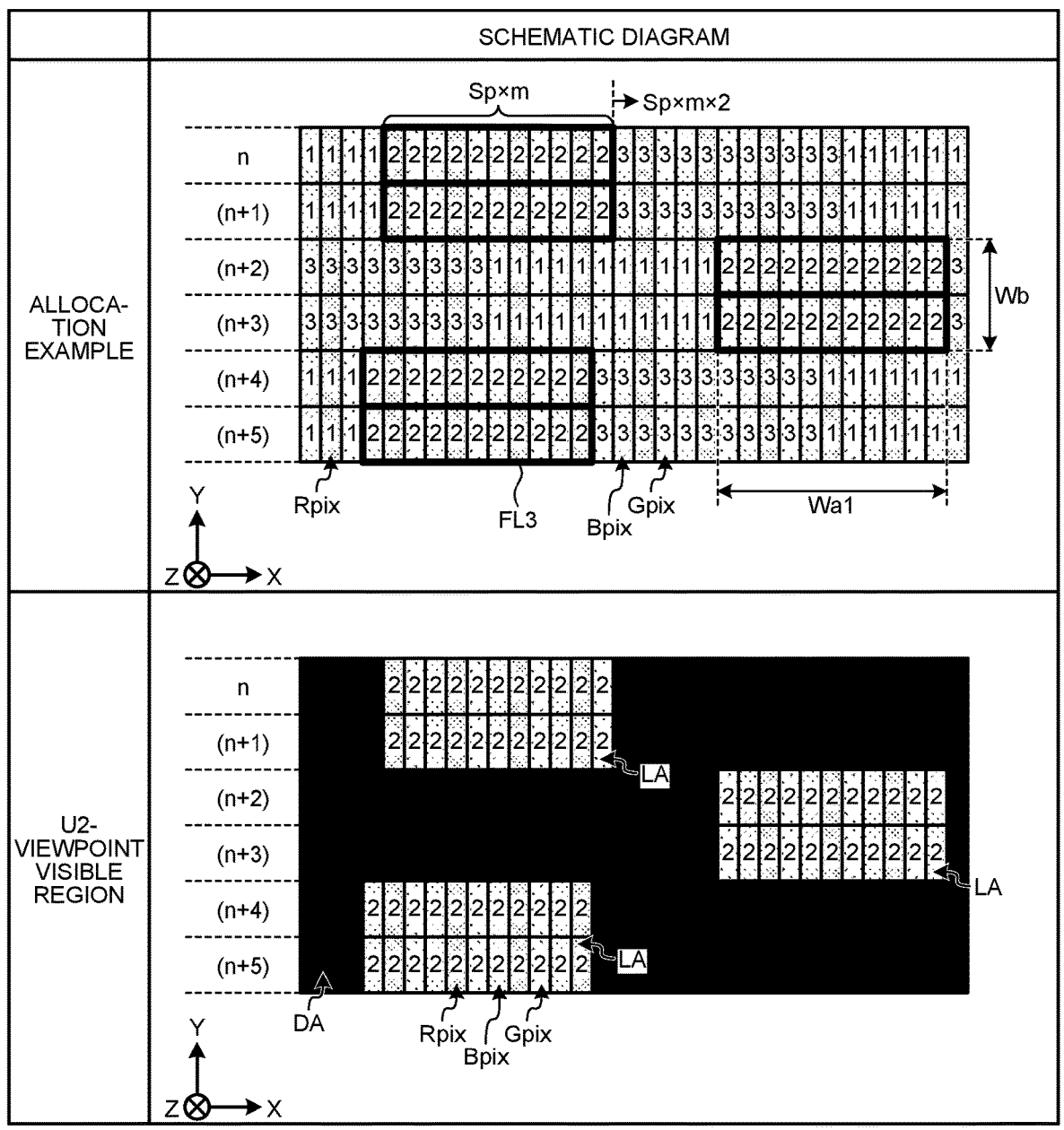
FIG. 12 is a diagram illustrating an exemplary allocation of pixel signals to sub pixels and an exemplary arrangement of light transmitting regions and light shielding regions in a first modification.

FIG. 12 is a diagram illustrating an exemplary allocation of pixel signals to sub pixels and an exemplary arrangement of the light transmitting regions LA and the light shielding regions DA in a first modification. In FIG. 12, m is 11 as in FIGS. 6 and 7.

As illustrated in the "U2-viewpoint visible region" in FIG. 12, the plurality of light transmitting regions LA in the first modification are separated by two rows in the Y direction by the light shielding regions DA. The X-directional width of each light transmitting region LA corresponds to the width P, in other words, "Sp×m". The Y-directional width of each light transmitting region LA corresponds to two rows. The Y-directional width of each light shielding region DA interposed between the light transmitting regions LA adjacent to each other in the Y direction corresponds to two rows. The X-directional arrangement of the light transmitting regions LA adjacent to each other in the Y direction has a shift by one sub pixel in the X direction. As for the positional relation of two light transmitting regions LA facing each other in the Y direction with one light transmitting region LA interposed therebetween (hereinafter, the middle light transmitting region LA), which is not illustrated, the direction of shift of one of the two light transmitting regions LA relative to the middle light transmitting region LA in the X direction is different from the direction of shift of the other of the two light transmitting regions LA relative to the middle light transmitting region LA in the X direction, and consequently, the light transmitting region has a stepped shape. This configuration is the same as the light transmitting region LA described above with reference to FIG. 7.

The X-directional arrangement of the light transmitting regions LA illustrated in FIG. 12 is the same as the X-directional arrangement of the light transmitting regions LA described above with reference to FIGS. 6 and 7 in that the light transmitting regions LA having an X-directional width (the width P) corresponding to "Sp×m" and the light shielding regions DA having a width obtained by multiplying the X-directional width of the light transmitting region LA by a "number obtained by subtracting one from the number of viewpoints" are alternately arranged in the X direction on each row. The X-directional distance between two light transmitting regions LA included in four rows corresponds to α sub pixels or (α+1) sub pixels. In FIG. 12, the light transmitting region LA positioned on the n-th row and the (n+1)th row and the light transmitting region LA positioned on the (n+2)th row and the (n+3)th row are shifted from each other by five sub pixels in the X direction. In FIG. 12, the light transmitting region LA positioned on the (n+2)th row and the (n+3)th row and the light transmitting region LA positioned on the (n+4)th row and the (n+5)th row are shifted from each other by six sub pixels in the X direction. In a non-illustrated subsequent area, the shift by five sub pixels and the shift by six sub pixels alternately occur by two rows in the arrangement of the light transmitting regions LA. Each light transmitting region LA disposed as described above is surrounded by the light shielding regions DA.

The pixel signal allocation to the sub pixels corresponds to the arrangement of the light transmitting regions LA. As illustrated in the "allocation example" in FIG. 12, the arrangement of regions FL3 each including sub pixels visually recognizable at one viewpoint (for example, the viewpoint U2) is the same as the arrangement of the light transmitting regions LA described above with reference to the "U2-viewpoint visible region" in FIG. 12. Each light transmitting region LA in the first modification has an X-directional width Wa1 longer than a Y-directional width Wb. With this configuration, the perceived resolution of an image can be more easily improved. The width Wb of each light transmitting region LA in the first modification corresponds to two sub pixels in the Y direction. Thus, in the second direction as well, the perceived resolution of an image can be more easily improved as compared to the embodiment.

Second Modification

Figure 13:
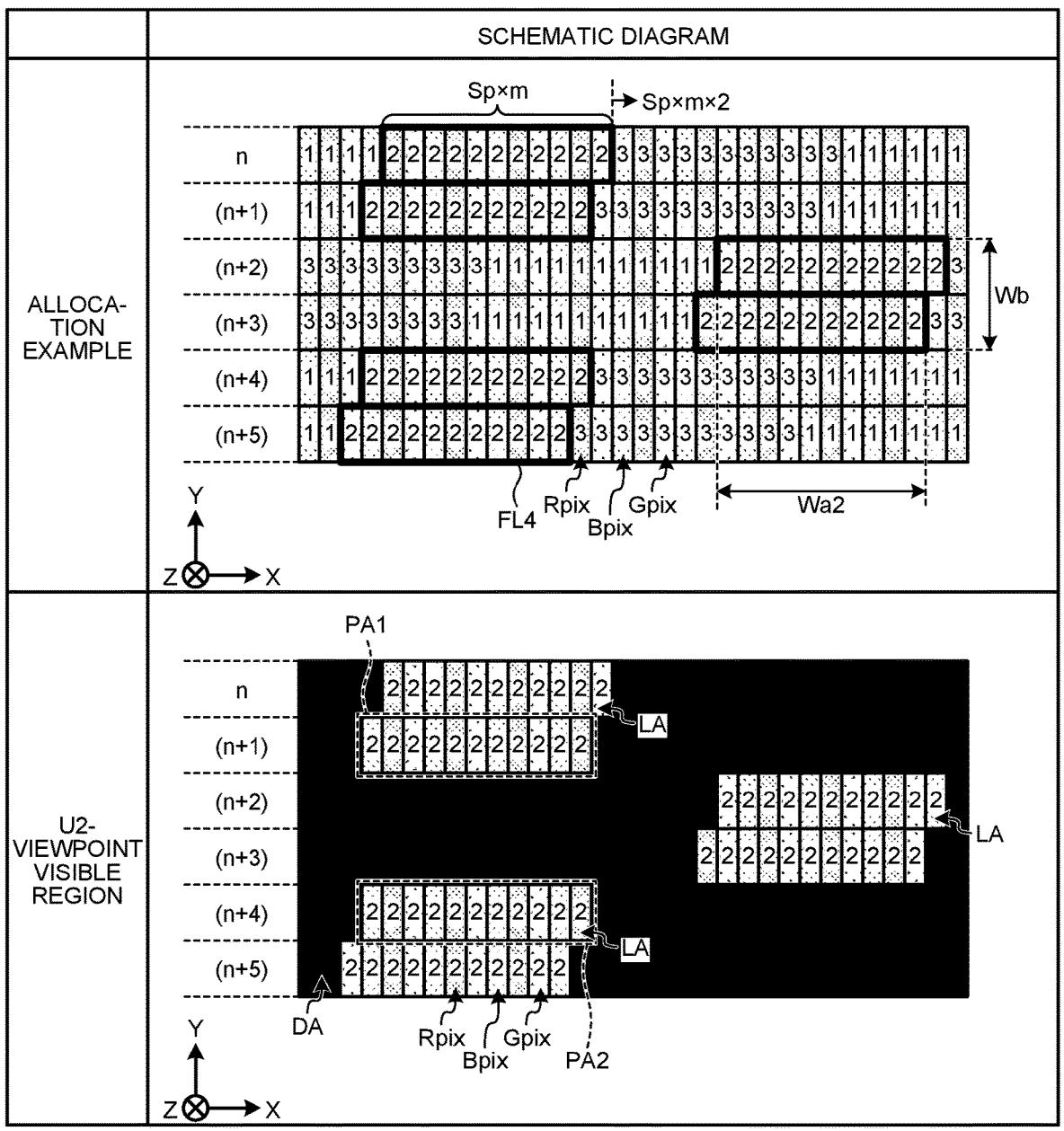
FIG. 13 is a diagram illustrating an exemplary allocation of pixel signals to sub pixels and an exemplary arrangement of light transmitting regions and light shielding regions in a second modification.

FIG. 13 is a diagram illustrating an exemplary allocation of pixel signals to sub pixels and an exemplary arrangement of the light transmitting regions LA and the light shielding regions DA in a second modification.

As illustrated in the "U2-viewpoint visible region" in FIG. 13, each light transmitting region LA in the second modification has a Y-directional width corresponding to two rows, and an X-directional area corresponding to one of the two rows and an X-directional area corresponding to the other row are shifted from each other by one sub pixel in the X direction. The X-directional width corresponding to each of the two rows corresponds to the width P, in other words, "Sp×m". The Y-directional width of each light shielding region DA interposed between the light transmitting regions LA adjacent to each other in the Y direction corresponds to two rows. The X-directional position of a part PA1 is the same as that of a part PA2. The part PA1 is one row in the area of two rows included in one of two light transmitting regions LA adjacent to each other in the Y direction, the one row being positioned on the other light transmitting region LA side with the light shielding region DA interposed therebetween. The part PA2 is one row in the area of two rows included in the other light transmitting region LA, the one row being positioned on the one light transmitting region LA side with the light shielding region DA interposed therebetween. As for the positional relation of two light transmitting regions LA facing each other in the Y direction with one light transmitting region LA interposed therebetween (hereinafter, the middle light transmitting region LA), which is not illustrated, the direction of shift of one of the two light transmitting regions LA relative to the middle light transmitting region LA in the X direction is different from the direction of shift of the other of the two light transmitting regions LA relative to the middle light transmitting region LA in the X direction. This configuration is the same as the light transmitting region LA described above with reference to FIG. 7.

The X-directional arrangement of the light transmitting regions LA illustrated in FIG. 13 is the same as the X-directional arrangement of the light transmitting regions LA described above with reference to FIGS. 6 and 7 in that the light transmitting regions LA having an X-directional width (the width P) corresponding to "Sp×m" and the light shielding regions DA having a width obtained by multiplying the X-directional width of the light transmitting region LA by a "number obtained by subtracting one from the number of viewpoints" are alternately arranged in the X direction on each row. The X-directional distance between one row on the other light transmitting region LA side in the area of two rows included in one of two light transmitting regions LA included in four rows and one row on the one light transmitting region LA side in the area of two rows included in the other light transmitting region LA corresponds to a sub pixels or (α+1) sub pixels. In FIG. 13, the row area of the light transmitting region LA positioned on the (n+1)th row and the row area of the light transmitting region LA positioned on the (n+2)th row are shifted from each other by six sub pixels in the X direction. In FIG. 13, the row area of the light transmitting region LA positioned on the (n+3)th row and the row area of the light transmitting region LA positioned on the (n+4)th row are shifted from each other by five sub pixels in the X direction. In a non-illustrated subsequent area, the shift by six sub pixels and the shift by five sub pixels alternately occur by two rows in the arrangement of the light transmitting regions LA. Each light transmitting region LA disposed as described above is surrounded by the light shielding regions DA.

The pixel signal allocation to the sub pixels corresponds to the arrangement of the light transmitting regions LA. As illustrated in the "allocation example" in FIG. 13, the arrangement of regions FL4 each including sub pixels visually recognizable at one viewpoint (for example, the viewpoint U2) is the same as the arrangement of the light transmitting regions LA described above with reference to the "U2-viewpoint visible region" in FIG. 13.

In a case in which each light transmitting region LA has a non-rectangular shape in plan view as in the second modification, the perceived resolution of an image can be more easily improved as in the first modification when an X-directional width Wa2 of a rectangle is longer than a Y-directional width Wb thereof, the rectangle being an area formed in the light transmitting region LA and having four sides including two facing sides extending in the X direction and the other two facing sides extending in the Y direction.

Third Modification

Figure 14:
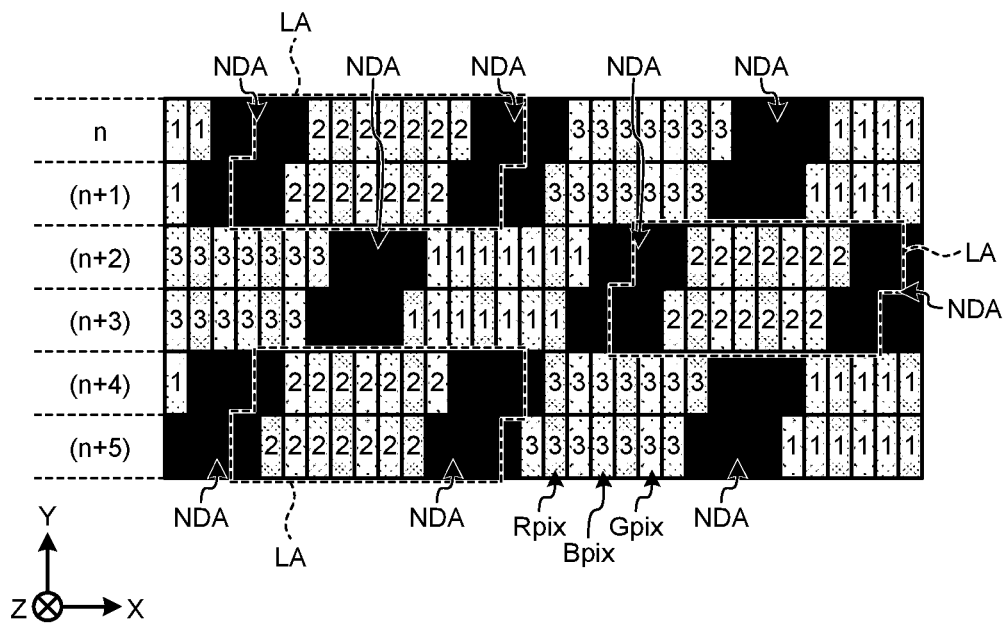
FIG. 14 is a diagram illustrating an exemplary allocation of pixel signals to sub pixels in a third modification.

FIG. 14 is a diagram illustrating an exemplary allocation of pixel signals to sub pixels in a third modification. In the third modification, the degree of light transmission at some sub pixels is controlled to be lowest irrespective of an output image. The sub pixels at which the degree of light transmission is controlled to be lowest do not contribute to the image output. Specifically, some sub pixels close to end parts at both ends of each row in the X direction in the region FL4 (refer to FIG. 13) in the second modification are set as target sub pixels. In the third modification, the degree of light transmission at each target sub pixel is controlled to be lowest.

In FIG. 14, sub pixels serving as the target sub pixels are arranged two at each end in the X direction of each row of the region FL4; that is, two target sub pixels are located close to the corresponding end of each row. In FIG. 13, the region FL4 is illustrated specially for sub pixel "2", but similarly to sub pixels "2", the region FL4 is formed for sub pixels "1" and for sub pixels "3" as well, and the region FL4 of sub pixels "1", the region FL4 of sub pixels "2", and the region FL4 of sub pixels "3" are periodically arranged. In other words, in FIG. 13, the region FL4 of sub pixels "1", the region FL4 of sub pixels "2", and the region FL4 of sub pixels "3" are arranged in the X direction. Thus, two pixels close to each ends in the X direction of each row of each region FL4 are handled as target sub pixels, and thus, the four target sub pixels and seven sub pixels assigned any of "1", "2", and "3" are alternately arranged in the X direction in each row in FIG. 14. Regions in which the target sub pixels are arranged are illustrated as black regions NDA in FIG. 14. Although not illustrated, when one pixel close to each end in the X direction of each row of the region FL4 is handled as a target sub pixel, the two target sub pixels and nine sub pixels assigned any of "1", "2", and "3" are alternately arranged in the X direction in each row.

Figure 15:
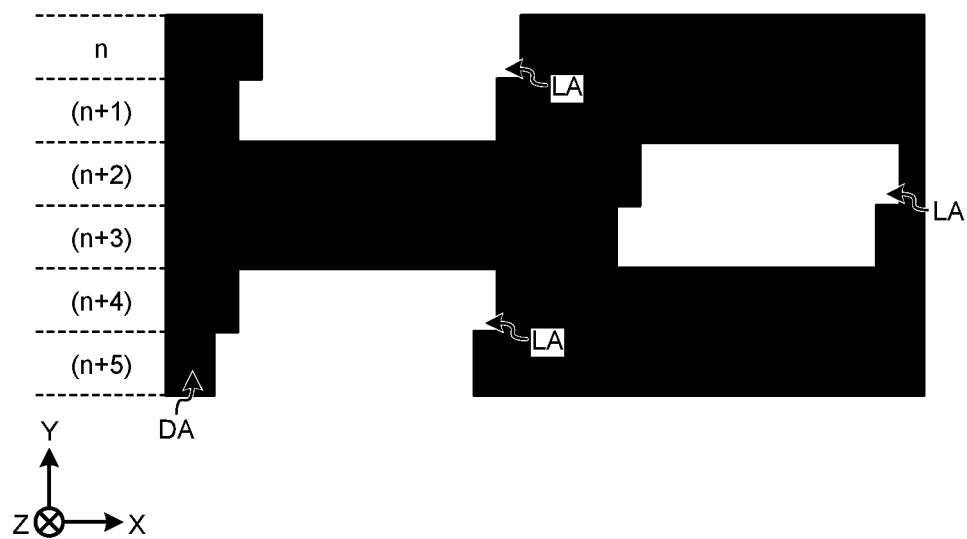
FIG. 15 is a diagram illustrating an exemplary arrangement of light transmitting regions and light shielding regions in the third modification.

FIG. 15 is a diagram illustrating an exemplary arrangement of the light transmitting regions LA and the light shielding regions DA in the third modification. The shapes and arrangement of the light transmitting regions LA and the light shielding regions DA illustrated in FIG. 15 in plan view are the same as the shapes and arrangement of the light transmitting regions LA and the light shielding regions DA in the second modification described above with reference to FIG. 13 in plan view. Thus, in the third modification, a visual recognition area includes not only sub pixels assigned numbers corresponding to respective viewpoints in the light transmitting regions LA but also target sub pixels as illustrated in FIG. 14.

Figure 16:
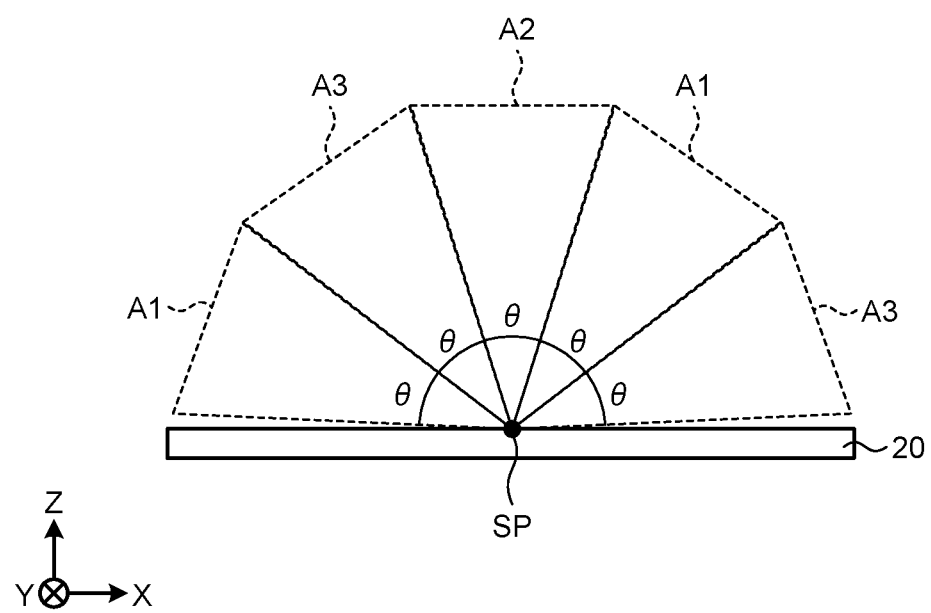
FIG. 16 is a schematic diagram illustrating view angles at which a plurality of images visually recognizable by the multi-view output are each visually recognizable.

FIG. 16 is a schematic diagram illustrating view angles at which a plurality of images visually recognizable by the multi-view output are each visually recognizable. The center SP illustrated in FIG. 16 represents the central position in the X direction of the display region AA in the display device 20. A view angle range A1 is a view angle range in which sub pixels "1" are visually recognizable in the second modification. A view angle range A2 is a view angle range in which sub pixels "2" are visually recognizable in the second modification. A view angle range A3 is a view angle range in which sub pixels "3" are visually recognizable in the second modification. Angle θ in FIG. 16 is, for example, 35° but is not restrictive and is changeable as appropriate.

In the second modification, sub pixels configured to output images to different viewpoints are adjacent to each other in the X direction. Thus, images to a plurality of viewpoints are simultaneously visually recognizable near the boundary position angle between the view angle ranges A1 and A2, near the boundary position angle between the view angle ranges A2 and A3, and near the boundary position angle between the view angle ranges A3 and A1 in some cases. In other words, what is called crosstalk occurs near these boundary position angles in some cases.

Thus, in the third modification, target sub pixels are not allowed to contribute to the image output, so that sub pixels configured to output images to different viewpoints are not adjacent to each other in the X direction. That is, it is possible to inhibit unintended visual recognition of sub pixels for other viewpoints near the above-described boundary position angles. Even when sub pixels for other viewpoints are visually recognizable, the sub pixels are handled as target sub pixels in the third modification, and thus images for other viewpoints are not visually recognized. In this manner, crosstalk can be more reliably reduced in the third modification.

Although FIG. 14 illustrates an example in which target sub pixels are set in the second modification described above with reference to FIG. 13, the third modification is also applicable to the embodiment described above with reference to FIG. 7 and the first modification described above with reference to FIG. 12. In these applications as well, it is possible to more reliably reduce crosstalk by setting target sub pixels as some sub pixels close to ends at both ends in the X direction of each row in the region FL1 (refer to FIG. 7) or the region FL2. In multi-view for two viewpoints and multi-view for four viewpoints to be described later, as well, similarly to the third modification, it is possible to more reliably reduce crosstalk by setting target sub pixels as some sub pixels disposed near ends in the X direction of each light transmitting region LA.

Although the above description is made on the multi-view output for the three viewpoints of the viewpoints U1, U2, and U3, the number of viewpoints to which the multi-view output is possible in the present disclosure is not limited to three but may be any arbitrary number. The following sequentially describes other examples, namely, a fourth modification and a fifth modification related to the multi-view output to two viewpoints, and a sixth modification, a seventh modification, and the seventh modification related to the multi-view output to four viewpoints.

Fourth Modification

Figure 17:
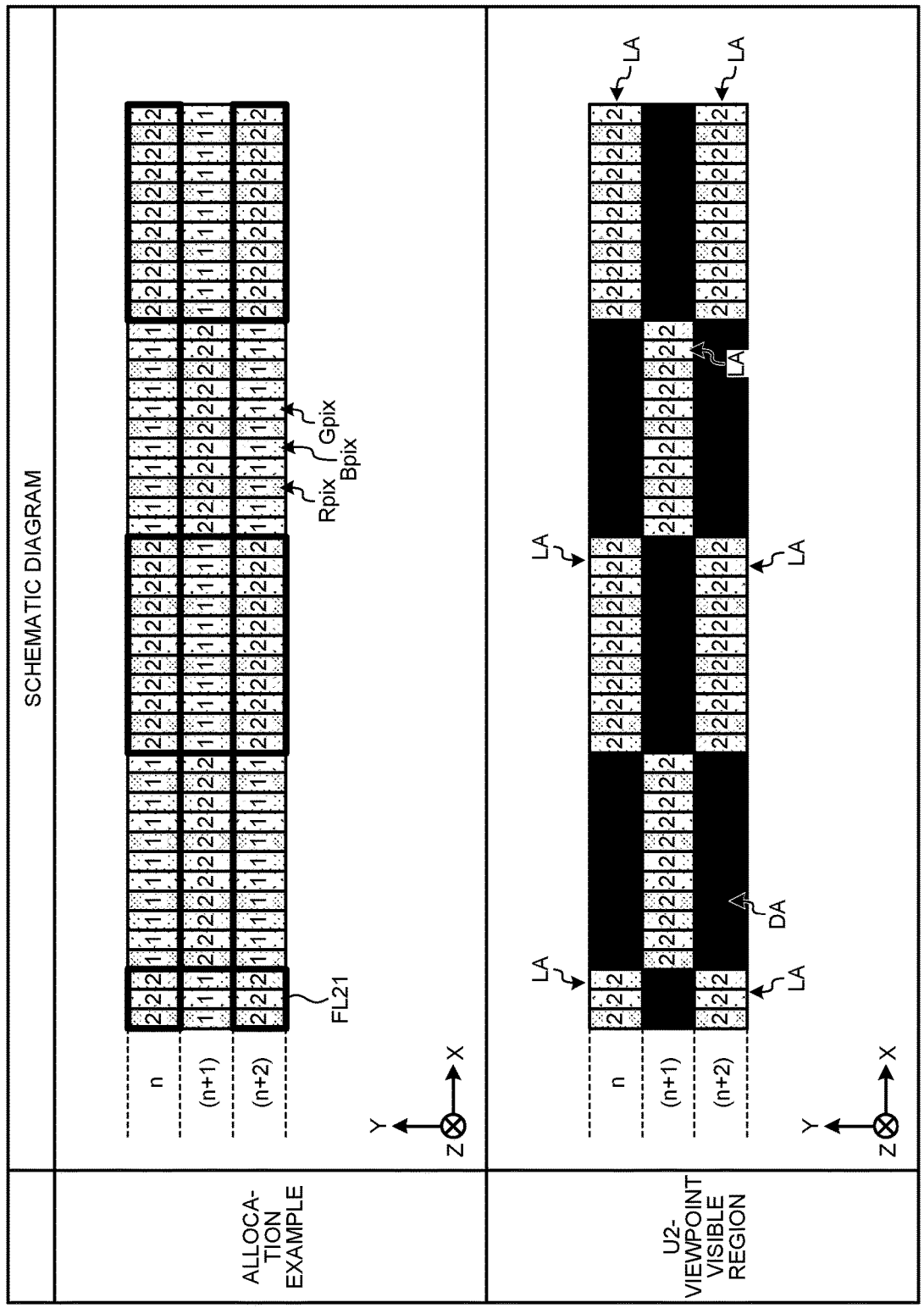
FIG. 17 is a diagram illustrating an exemplary allocation of pixel signals to sub pixels and an exemplary arrangement of light transmitting regions and light shielding regions in a fourth modification.

FIG. 17 is a diagram illustrating an exemplary allocation of pixel signals to sub pixels and an exemplary arrangement of the light transmitting regions LA and the light shielding regions DA in the fourth modification. In the "allocation example" in FIG. 17, m continuous sub pixels "1" in the X direction and m continuous sub pixels "2" in the X direction are alternately arranged in the X direction in each row. In the "allocation example" in FIG. 17, one sub pixel "1" and one sub pixel "2" are alternately arranged in each column. A region FL21 in the "allocation example" in FIG. 17 indicates an area of sub pixels "2", in particular.

The "U2-viewpoint visible region" in FIG. 17 illustrates the arrangement of the light transmitting regions LA and the light shielding regions DA when the display device 20 is viewed from a user who can visually recognize an image output through the region FL21 in the "allocation example" in FIG. 17. As illustrated in the "U2-viewpoint visible region" in FIG. 17, in the fourth modification, the light transmitting regions LA and the light shielding regions DA each having the width P, in other words, the width corresponding to "Sp×m" in the X direction and having a width corresponding to one sub pixel in the Y direction are arranged in a staggered pattern. Although not illustrated, any other user who cannot visually recognize an image output through the region FL21 in the "allocation example" in FIG. 17 can visually recognize sub pixels "1" in the "allocation example" in FIG. 17.

Fifth Modification

Figure 18:
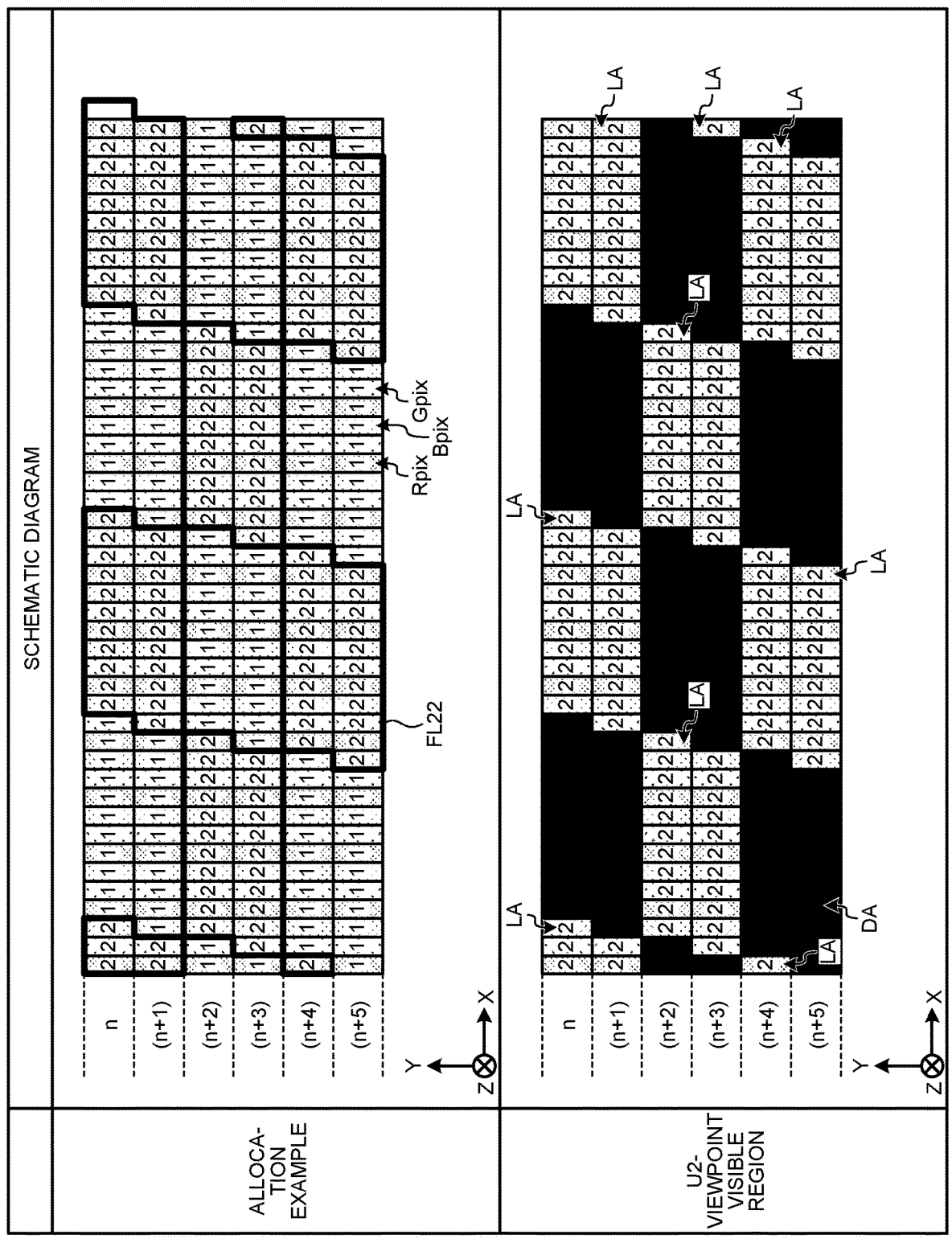
FIG. 18 is a diagram illustrating an exemplary allocation of pixel signals to sub pixels and an exemplary arrangement of light transmitting regions and light shielding regions in a fifth modification.

FIG. 18 is a diagram illustrating an exemplary allocation of pixel signals to sub pixels and an exemplary arrangement of the light transmitting regions LA and the light shielding regions DA in the fifth modification. As illustrated in the "U2-viewpoint visible region" in FIG. 18, the light transmitting regions LA having a width corresponding to m sub pixels in the X direction and the light shielding regions DA having a width corresponding to m sub pixels in the X direction are alternately arranged in the X direction in each row.

As illustrated in the "U2-viewpoint visible region" in FIG. 18, similarly to each light transmitting region LA in the second modification, each light transmitting region LA in the fifth modification has a Y-directional width corresponding to two rows, and an X-directional area corresponding to one of the two rows and an X-directional area corresponding to the other row are shifted from each other by one sub pixel in the X direction. The X-directional width corresponding to each of the two rows corresponds to the width P, in other words, "Sp×m". The Y-directional width of each light shielding region DA interposed between the light transmitting regions LA adjacent to each other in the Y direction corresponds to two rows.

The X-directional position of one row in the area of two rows included in one of two light transmitting regions LA adjacent to each other in the Y direction, the one row being positioned on the other light transmitting region LA side with the light shielding region DA interposed therebetween, is shifted by one sub pixel from the X-directional position of one row in the area of two rows included in the other light transmitting region LA, the one row being positioned on the one light transmitting region LA side with the light shielding region DA interposed therebetween.

Similarly to each light transmitting region LA in the fifth modification, each light shielding region DA in the fifth modification has a Y-directional width corresponding to two rows, and an X-directional area corresponding to one of the two rows and an X-directional area corresponding to the other row are shifted from each other by one sub pixel in the X direction. The X-directional width corresponding to each of the two rows corresponds to the width P, in other words, "Sp×m".

The X-directional position of one row in the area of two rows included in one of two light shielding regions DA adjacent to each other in the Y direction, the one row being positioned on the other light shielding region DA side with the light transmitting region LA interposed therebetween, is shifted by one sub pixel from the X-directional position of one row in the area of two rows included in the other light shielding region DA, the one row being positioned on the one light shielding region DA side with the light transmitting region LA interposed therebetween.

In other words, the shape of each light transmitting region LA and the shape of each light shielding region DA are identical to each other in effect. In the fifth modification, such light transmitting regions LA and light shielding regions DA are alternately arranged in the X and Y directions. Among the light transmitting region LA and the light shielding region DA adjacent to each other in the Y direction, the X-directional position of one row in the light transmitting region LA positioned on the light shielding region DA side is the same as the X-directional position of one row in the light shielding region DA positioned on the light transmitting region LA side.

The pixel signal allocation to the sub pixels corresponds to the arrangement of the light transmitting regions LA. As illustrated in the "allocation example" in FIG. 13, the arrangement of the regions FL4 including sub pixels visually recognizable at one viewpoint (for example, the viewpoint U2) is the same as the arrangement of the light transmitting regions LA described above with reference to the "U2-viewpoint visible region" in FIG. 13.

Sixth Modification

Figure 19:
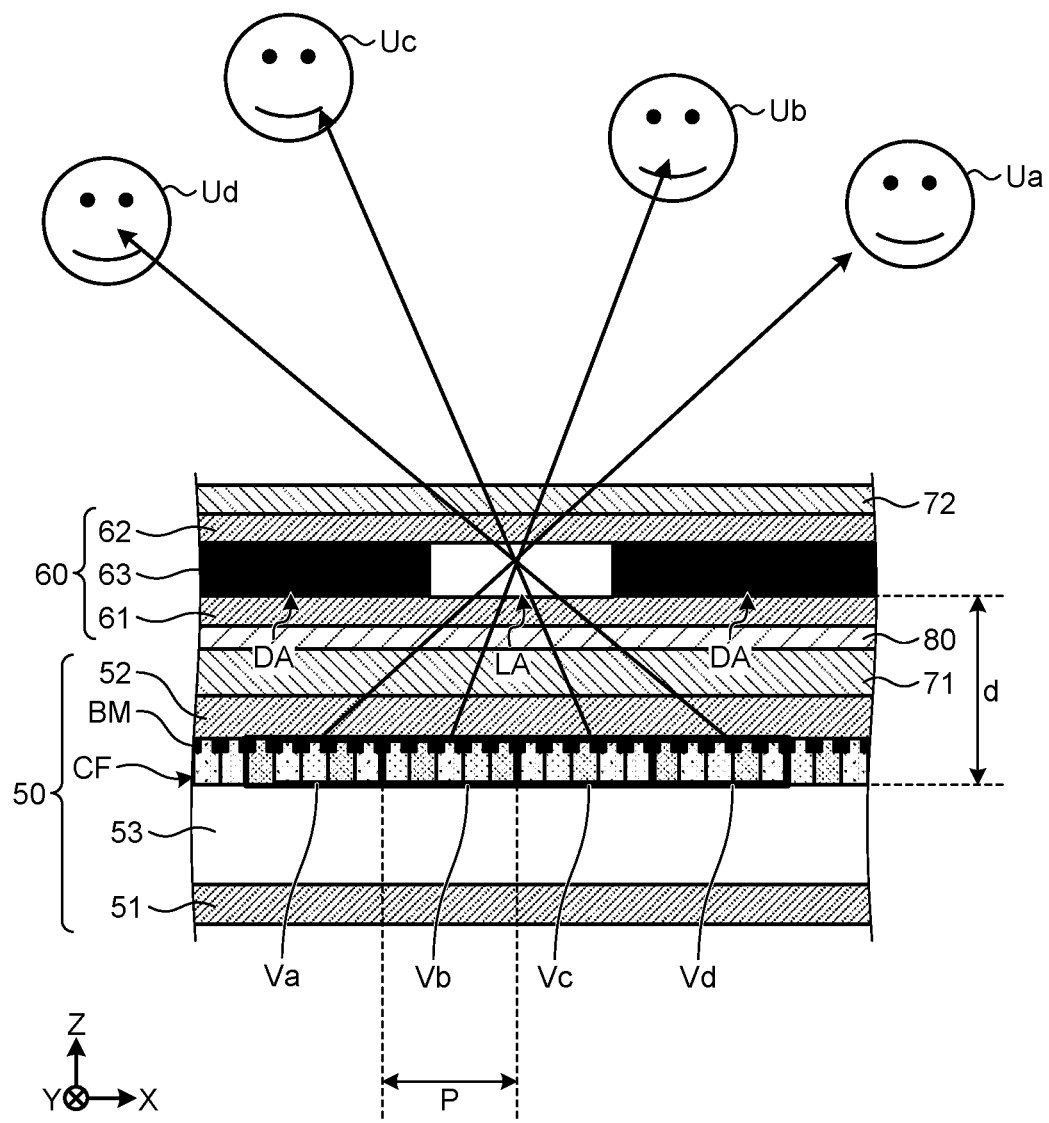
FIG. 19 is a schematic diagram illustrating the multi-view output to four viewpoints.

FIG. 19 is a schematic diagram illustrating the multi-view output to four viewpoints. As illustrated in FIG. 19, in the multi-view output to four viewpoints, through one light transmitting region LA, light passing through a color filter positioned in a region Va in the color filter layer CF reaches a viewpoint Ua, light passing through a color filter positioned in a region Vb reaches a viewpoint Ub, light passing through a color filter positioned in a region Vc reaches a viewpoint Uc, and light passing through a color filter positioned in a region Vd reaches a viewpoint Ud.

Figure 20:
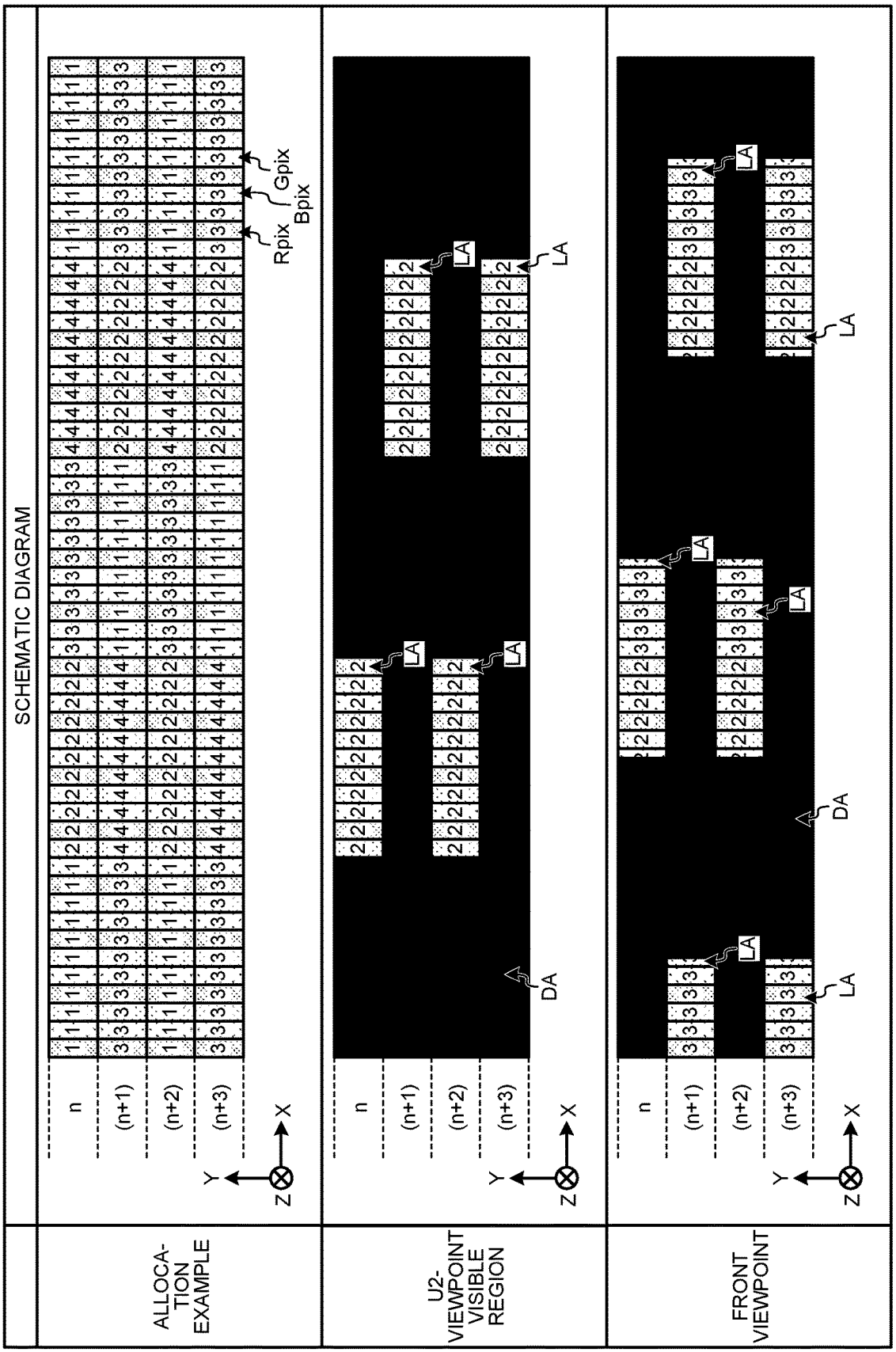
FIG. 20 is a diagram illustrating an exemplary allocation of pixel signals to sub pixels and an exemplary arrangement of light transmitting regions and light shielding regions in a sixth modification.
Figure 21:
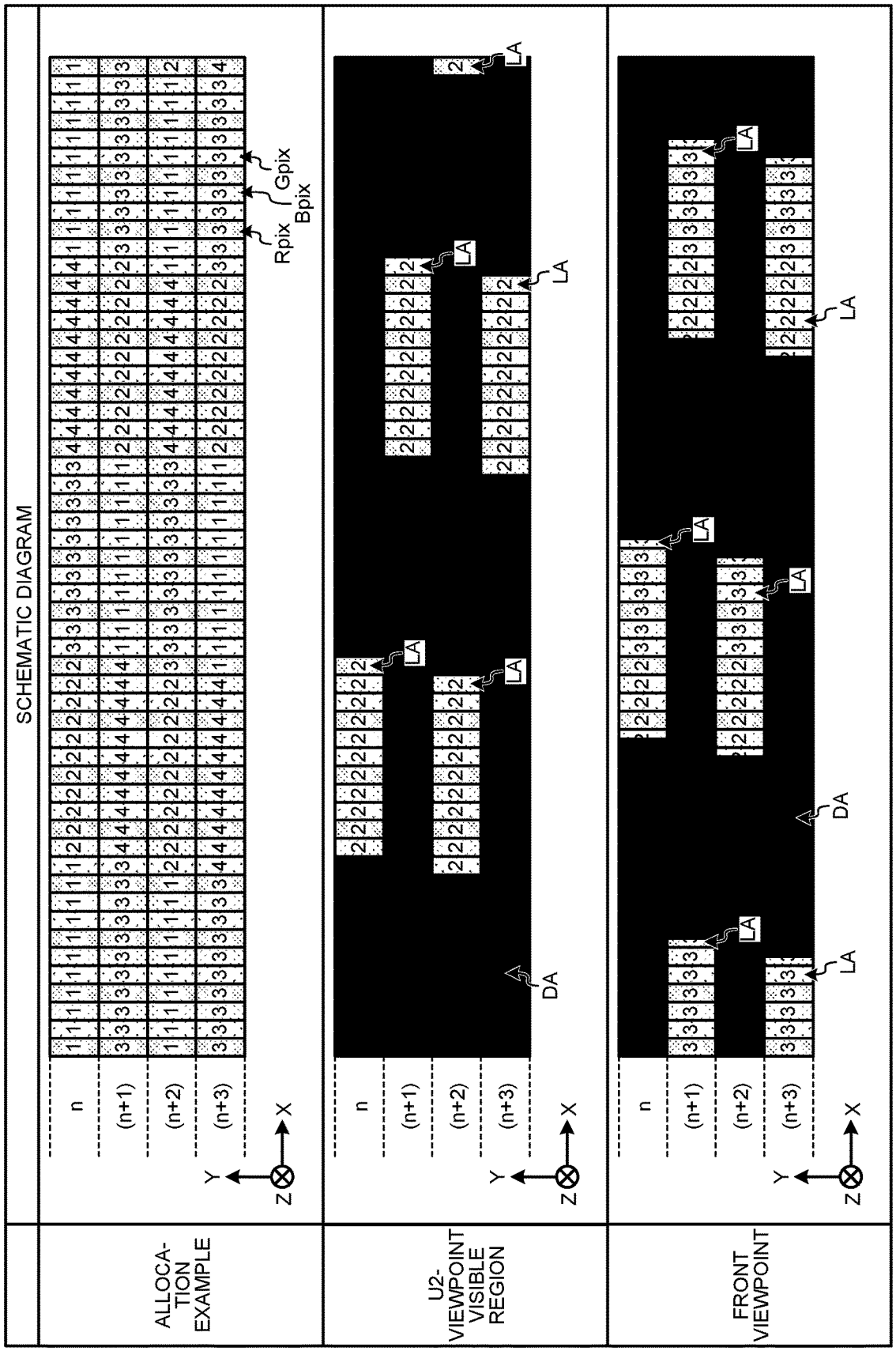
FIG. 21 is a diagram illustrating an exemplary allocation of pixel signals to sub pixels and an exemplary arrangement of light transmitting regions and light shielding regions in a seventh modification.
Figure 22:
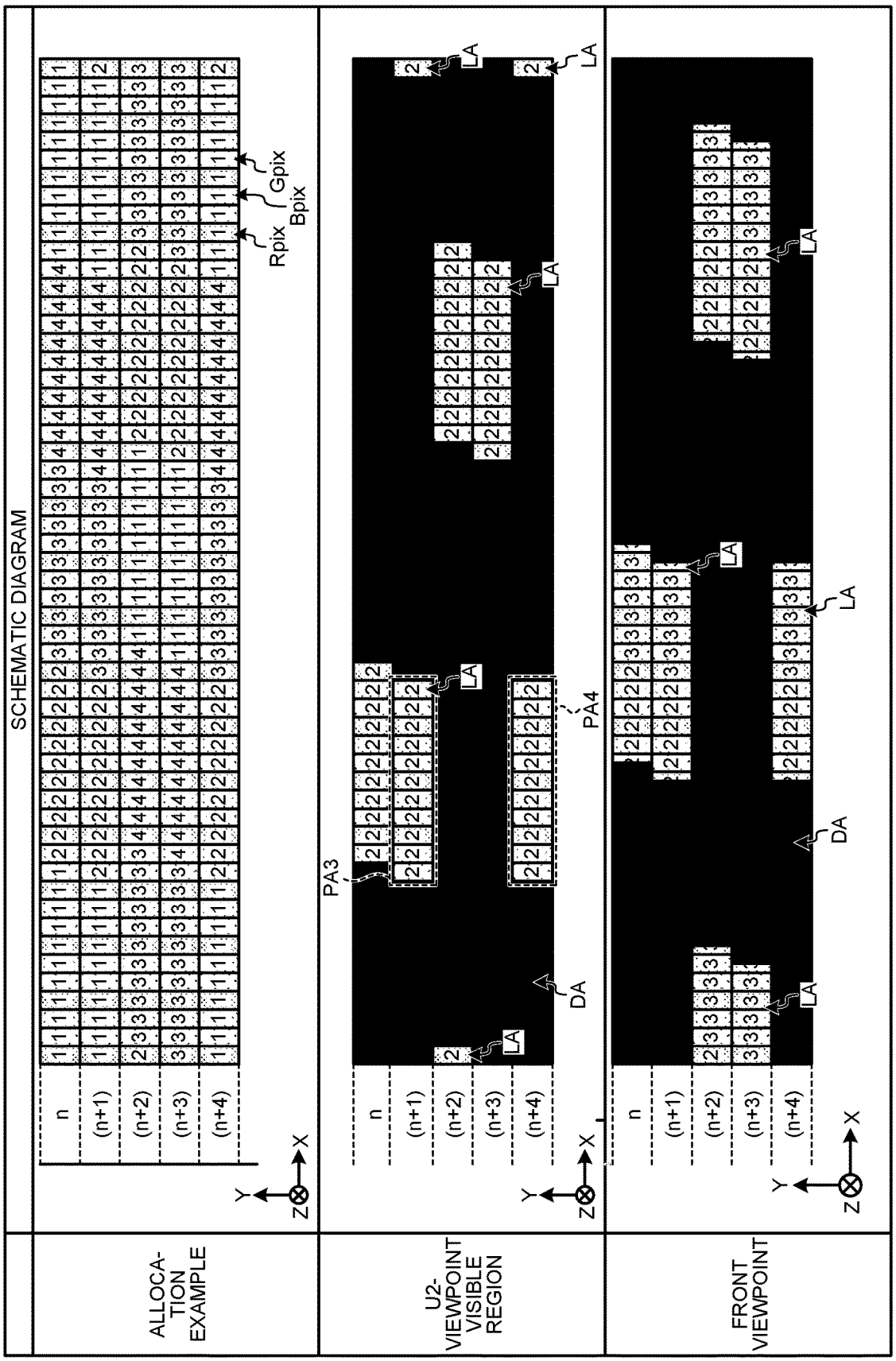
FIG. 22 is a diagram illustrating an exemplary allocation of pixel signals to sub pixels and an exemplary arrangement of light transmitting regions and light shielding regions in an eighth modification.

FIG. 20 is a diagram illustrating an exemplary allocation of pixel signals to sub pixels and an exemplary arrangement of the light transmitting regions LA and the light shielding regions DA in the sixth modification. In FIGS. 20, 21, and 22, sub pixels positioned on the line of light visually recognized at the viewpoint Ua (refer to FIG. 19) are assigned "1". Sub pixels positioned on the line of light visually recognized at the viewpoint Ub are assigned "2". Sub pixels positioned on the line of light visually recognized at the viewpoint Uc are assigned "3". Sub pixels positioned on the line of light visually recognized at the viewpoint Ud are assigned "4". The "U2-viewpoint visible region" in FIGS. 20, 21, and 22 illustrates sub pixels visually recognizable at the viewpoint Ub through the light transmitting regions LA as illustrated in FIG. 19. Although not illustrated, sub pixels "1" in the "allocation example" are visually recognizable at the viewpoint Ua through the light transmitting regions LA. Sub pixels "3" in the "allocation example" are visually recognizable at the viewpoint Uc through the light transmitting regions LA. Sub pixels "4" in the "allocation example" are visually recognizable at the viewpoint Ud through the light transmitting regions LA. A view from a front viewpoint different from any of the viewpoints Ua, Ub, Uc, and Ud is illustrated as a "front viewpoint" for comparison.

As illustrated in the "U2-viewpoint visible region" in FIG. 20, the X-directional arrangement of the light transmitting regions LA illustrated in FIG. 20 is the same as the X-directional arrangement of the light transmitting regions LA described above with reference to FIG. 6 in that the light transmitting regions LA having an X-directional width (the width P) corresponding to "Sp×m" and the light shielding regions DA having a width obtained by multiplying the X-directional width of the light transmitting region LA by a "number obtained by subtracting one from the number of viewpoints" are alternately arranged in the X direction in each row. The Y-directional width of each light transmitting region LA corresponds to one row. The Y-directional width of each light shielding region DA interposed between the light transmitting regions LA adjacent to each other in the Y direction corresponds to one row. The X-directional positions of the light transmitting regions LA adjacent to each other in the Y direction are the same. The arrangement of the light transmitting regions LA in one of two rows adjacent to each other and the arrangement of the light transmitting regions LA in the other row are shifted from each other in the X direction by a width (width P) corresponding to "Sp×m". Each light transmitting region LA disposed as described above is surrounded by the light shielding regions DA.

The pixel signal allocation to the sub pixels corresponds to the arrangement of the light transmitting regions LA. As illustrated in the "allocation example" in FIG. 20, the arrangement of regions including sub pixels visually recognizable at one viewpoint (for example, the viewpoint Ub) is the same as the arrangement of the light transmitting regions LA described above with reference to the "U2-viewpoint visible region" in FIG. 20.

Seventh Modification

FIG. 21 is a diagram illustrating an exemplary allocation of pixel signals to sub pixels and an exemplary arrangement of the light transmitting regions LA and the light shielding regions DA in the seventh modification. In the seventh modification, the X-directional arrangements of the light transmitting regions LA adjacent to each other in the Y direction are shifted from each other by one sub pixel in the X direction. As for the positional relation of two light transmitting regions LA facing each other in the Y direction with one light transmitting region LA interposed therebetween (hereinafter, the middle light transmitting region LA), the direction of shift of one of the two light transmitting regions LA relative to the middle light transmitting region LA in the X direction is different from the direction of shift of the other of the two light transmitting regions LA relative to the middle light transmitting region LA in the X direction. The X-directional distance between each light transmitting region LA provided in one of two rows adjacent to each other and the corresponding light transmitting region LA provided in the other row is equal to the X-directional width (width P) corresponding to "Sp×m" or the sum of the X-directional width (width P) corresponding to "Sp×m" and the width corresponding to one sub pixel. In FIG. 21, the light transmitting region LA positioned in the n-th row and a light transmitting region LA positioned in the (n+1)th row are shifted from each other in X direction by a width (the width P) corresponding to "Sp×m" in the X direction. In FIG. 21, the light transmitting region LA positioned in the (n+1)th row and the light transmitting region LA positioned on the (n+2)th row are shifted from each other in the X direction by a width (the width P) corresponding to "Sp× m"+1 in the X direction. Such shift alternately occurs to the arrangement of the light transmitting regions LA in subsequent rows of the (n+3)th row, the (n+4)th row, . . . . The seventh modification is the same as the sixth modification except for the feature otherwise stated above.

Eighth Modification

FIG. 22 is a diagram illustrating an exemplary allocation of pixel signals to sub pixels and an exemplary arrangement of the light transmitting regions LA and the light shielding regions DA in the eighth modification.

As illustrated in the "U2-viewpoint visible region" in FIG. 22, each light transmitting region LA in the eighth modification has a Y-directional width corresponding to two rows, and X-directional area corresponding to one of the two rows and an X-directional area corresponding to the other row are shifted from each other by one sub pixel in the X direction. The X-directional width corresponding to each of the two rows corresponds to the width P, in other words, "Sp×m". The Y-directional width of each light shielding region DA interposed between the light transmitting regions LA adjacent to each other in the Y direction corresponds to two rows. The X-directional position of a part PA3 is the same as that of a part PA4. The part PA3 is one row in the area of two rows included in one of two light transmitting regions LA adjacent to each other in the Y direction, the one row being positioned on the other light transmitting region LA side with the light shielding region DA interposed therebetween. The part PA4 is one row in the area of two rows included in the other light transmitting region LA, the one row being positioned on the one light transmitting region LA side with the light shielding region DA interposed therebetween. As for the positional relation of two light transmitting regions LA facing each other in the Y direction with one light transmitting region LA interposed therebetween (hereinafter, the middle light transmitting region LA), which is not illustrated, the direction of shift of one of the two light transmitting regions LA relative to the middle light transmitting region LA in the X direction is different from the direction of shift of the other of the two light transmitting regions LA relative to the middle light transmitting region LA in the X direction. This configuration is the same as the light transmitting region LA described above with reference to FIG. 7.

The light transmitting regions LA are arranged such that the X-directional width of the light shielding region DA interposed between the region of one row positioned on the (n+1)th row side in the light transmitting region LA made up of continuous two rows of the n-th row and the (n+1)th row and the region of one row positioned on the (n+2)th row side in the light transmitting region LA made up of continuous two rows of the (n+2)th row and the (n+3)th row is alternately equal to the width corresponding to 13 sub pixels and the width corresponding to nine sub pixels. Each light transmitting region LA disposed as described above is surrounded by the light shielding regions DA.

The pixel signal allocation to the sub pixels corresponds to the arrangement of the light transmitting regions LA. As illustrated in the "allocation example" in FIG. 22, the arrangement of regions including sub pixels visually recognizable at one viewpoint (for example, the viewpoint Ub) is the same as the arrangement of the light transmitting regions LA described above with reference to the "U2-viewpoint visible region" in FIG. 22.

As described above, the display device (for example, the display device 20) includes a display panel (for example, the display panel 50), and a parallax formation panel (for example, the parallax formation panel 60, the parallax formation panel 60A, or the parallax formation panel 60B) disposed between the display panel and a viewpoint (for example, the viewpoint U1, U2, or U3). The parallax formation panel includes first electrodes (for example, either the electrodes 611 or 612, first electrodes 616, or first electrodes 656) and second electrodes (for example, the others of the electrodes 611 and 612, second electrodes 617, or second electrodes 657), the first electrode being provided to be able to form light transmitting regions (light transmitting regions LA) in accordance with the positions of a plurality of predetermined viewpoints (for example, the viewpoints U1, U2, and U3), the second electrode being provided to be able to form light shielding regions (light shielding regions DA) that shield regions other than the light transmitting regions from light. The width of each first electrode in the first direction (for example, the X direction) in which the viewpoints (for example, the viewpoints U1, U2, and U3) are arranged is longer than the length of the first electrode in the second direction (for example, the Y direction) orthogonal to the first direction and extending along the display surface of the display panel. With this configuration, the perceived resolution of an image can be more easily improved.

The parallax formation panel (for example, the parallax formation panel 60, the parallax formation panel 60A, or the parallax formation panel 60B) is a liquid crystal display panel including a third electrode (for example, electrode 621 or third electrode 660) disposed to face the first electrodes (for example, either the electrodes 611 or 612, first electrodes 616, or first electrodes 656) and the second electrodes (for example, the others of the electrodes 611 and 612, second electrodes 617, or second electrodes 657), and a region provided with the second electrode is provided to be able to form a light transmitting region in accordance with the potential difference from the third electrode. With this configuration, it is possible to switch between a state of forming the light transmitting regions LA and the light shielding regions DA in the multi-view output in which individual images are output to a plurality of viewpoints, and a state of allowing light transmission through the entire region (for example, display region AA) in which the first and the second electrodes are provided in the normal image output in which the same image is visually recognizable at a plurality of viewpoints.

As exemplarily illustrated in FIGS. 7, 12, 13, 17, 18, 20, 21, and 22, the light transmitting regions (light transmitting regions LA) and the light shielding regions (light shielding regions DA) are alternately arranged in the first direction (for example, the X direction) and alternately arranged in the second direction (for example, the Y direction) or a direction intersecting the first and the second directions and extending along the display surface of the display panel (for example, the display panel 50). With this configuration, the perceived resolution of an image can be more easily improved.

As exemplarily illustrated in FIGS. 7, 12, 13, 17, 18, 20, 21, and 22, the display panel (for example, the display panel 50) includes sub pixels (for example, the first sub pixel Rpix, the second sub pixel Gpix, and the third sub pixel Bpix)

having a plurality of colors and periodically arranged in the first direction (for example, the X direction), and each of the light transmitting regions (light transmitting region LA) includes the sub pixels having all the colors. With this configuration, it is possible to reduce the occurrence of color deviation to an image visually recognizable at each viewpoint.

As exemplarily illustrated in FIGS. 7, 12, 13, 18, 21, and 22, two light transmitting regions (light transmitting regions LA) adjacent to each other in the second direction (for example, the Y direction) are shifted from each other by one sub pixel or more in the first direction (for example, the X direction). With this configuration, it is possible to more reliably reduce the occurrence of color deviation to an image visually recognizable at each viewpoint. In particular, with such arrangement of the light transmitting regions, it is possible to more reliably reduce the occurrence of color deviation to an image visually recognizable at each viewpoint in a case of a sub-pixel arrangement in which the colors of sub pixels arranged in the second direction are uniform.

As exemplarily illustrated in FIGS. 12, 13, 18, and 22, each of the light transmitting regions (light transmitting region LA) includes two sub pixels or more arranged in the second direction (for example, the Y direction). With this configuration, the perceived resolution of an image can be more easily improved in the second direction as well.

As exemplarily illustrated with FIGS. 13 and 22, in each of the light transmitting regions (light transmitting region LA), a region including a sub pixel positioned on one end side in the second direction of two sub pixels arranged in the second direction (for example, the Y direction) and a region including a sub pixel positioned on the other end side in the second direction of the two sub pixels are shifted from each other by one sub pixel or more the first direction. With this configuration, it is possible to more reliably reduce the occurrence of color deviation to an image visually recognizable at each viewpoint. In particular, with such arrangement of the light transmitting regions, it is possible to more reliably reduce the occurrence of color deviation to an image visually recognizable at each viewpoint in a case of a sub-pixel arrangement in which the colors of sub pixels arranged in the second direction are uniform.

As described above with reference to FIGS. 14, 15, and 16, sub pixels positioned at both ends in the first direction (for example, the X direction) among sub pixels visually recognizable at one viewpoint through one of the light transmitting regions (light transmitting regions LA) are controlled to have a lowest degree of light transmission. Thus, it is possible to more reliably reduce crosstalk.

Two viewpoints in the multi-view output to the two viewpoints, which is described above with reference to FIGS. 17 and 18 may be, for example, two of the viewpoints U1, U2, and U3 illustrated in FIG. 2 or two of the viewpoints Ua, Ub, Uc, and Ud illustrated in FIG. 19 or may be two viewpoints in a view angle relation different from that of the above-described viewpoints with the display device 20. With any relation between a plurality of viewpoints and the display device 20, it is possible to achieve the multi-view output without problem by setting an appropriate relation between the width P and the distance d.

Among exemplarily Z-directional thicknesses of components included in the area of the distance d, the Z-directional thicknesses of the second substrate 52 and the first substrate 61 are 1200 um approximately, and the Z-directional thicknesses of the polarization layer 71 and the OCA 80 are 100 um approximately. The relation between the distance d and the width P in accordance with the number of viewpoints and the view angle difference between viewpoints is preferably determined with theses thicknesses of components taken into account.

In the examples illustrated in FIGS. 7, 12, 13, 18, 21, and 22, each two light transmitting regions (light transmitting regions LA) adjacent to each other in the second direction (for example, the Y direction) are shifted from each other by one sub pixel in the first direction (for example, the X direction), but this amount of shift is not limited to one sub pixel and may be equal to or larger than two sub pixels. In the examples illustrated in FIGS. 13 and 22, in each of the light transmitting regions (light transmitting region LA), a region including sub pixels positioned on one end side in the second direction of two sub pixels arranged in the second direction (for example, the Y direction) and a region including sub pixels positioned on the other end side in the second direction of the two sub pixels are shifted from each other by one sub pixel in the first direction, but this amount of shift is not limited to one sub pixel and may be equal to or larger than two sub pixels.

Each electrode provided to form the light transmitting region LA or the light transmitting region LA may have a length corresponding to three sub pixels or more in the Y direction. In this case as well, the X-directional width of each electrode provided to form the light transmitting region LA or the light transmitting region LA only needs to be significantly longer than the Y-directional length thereof. When each light transmitting region LA and the electrode in the X direction has a step or a tilt along which both ends thereof are not aligned with the Y direction, the X-directional width of a rectangle that can be formed in the light transmitting region LA and the electrode only needs to be longer than the Y-directional length of the rectangle.

The display panel 50 is, for example, a liquid crystal display panel of an FFS system, but not limited thereto and may employ a TN system, a vertical alignment (VA) system, an in-plane switching (IPS) system, or any other system applicable to a liquid crystal display panel. The parallax formation panel 60 is not limited to the TN system nor the FFS system described above but may employ any other system applicable to a liquid crystal display panel. The parallax formation panel 60 is preferably what is called a normally black type that does not allow light transmission when the panel is not in operation, but may be what is called a normally white type that allows light transmission when the panel is not in operation.

It should be understood that the present disclosure provides any other effects achieved by aspects described above in the embodiment and the modifications, such as effects that are clear from the description of the present specification or effects that could be thought of by the skilled person in the art as appropriate.

What is claimed is:

1. A display device comprising:
 a display panel; and
 a parallax formation panel disposed between the display panel and a viewpoint, wherein
 the parallax formation panel includes first electrodes and second electrodes, the first electrodes being provided to be able to form light transmitting regions in accordance with positions of a plurality of predetermined viewpoints, the second electrodes being provided to be able to form light shielding regions that shield regions other than the light transmitting regions from light, and
 a width of each first electrode in a first direction in which the plurality of viewpoints are arranged is longer than a length of each first electrode in a second direction orthogonal to the first direction and extending along a display surface of the display panel.

2. The display device according to claim 1, wherein
the parallax formation panel is a liquid crystal display panel including a third electrode disposed to face the first and the second electrodes, and
a region provided with the second electrode is provided to be able to form a light transmitting region in accordance with a potential difference from the third electrode.

3. The display device according to claim 1, wherein the light transmitting regions and the light shielding regions are alternately arranged in the first direction and also alternately arranged in the second direction or a direction intersecting the first and the second directions and extending along the display surface of the display panel.

4. The display device according to claim 1, wherein
the display panel includes sub pixels having a plurality of colors and periodically arranged in the first direction, and
each light transmitting region includes the sub pixels having all the colors.

5. The display device according to claim 4, wherein two light transmitting regions adjacent to each other in the second direction are shifted from each other by one sub pixel or more in the first direction.

6. The display device according to claim 4, wherein each of the light transmitting regions includes two sub pixels or more arranged in the second direction.

7. The display device according to claim 6, wherein, in each of the light transmitting regions, a region including a sub pixel positioned on one end side in the second direction of two sub pixels arranged in the second direction and a region including a sub pixel positioned on the other end side in the second direction of the two sub pixels are shifted from each other by one sub pixel or more in the first direction.

8. The display device according to claim 4, wherein sub pixels positioned at both ends in the first direction among sub pixels visually recognizable at one viewpoint through one of the light transmitting regions are controlled to have a lowest degree of light transmission.

* * * * *